US012769585B2

(12) United States Patent
Moshe et al.

(10) Patent No.: US 12,769,585 B2
(45) Date of Patent: Oct. 20, 2026

(54) OFFLOADING DATA STORAGE DEVICE PROCESSING TASKS TO A GRAPHICS PROCESSING UNIT

(71) Applicant: Sandisk Technologies, Inc., Milpitas, CA (US)

(72) Inventors: Eran Moshe, Kfar Saba (IL); Shay Benisty, Beer Sheva (IL); Idan Goldenberg, Ramat Hasharon (IL)

(73) Assignee: Sandisk Technologies, Inc., Milpitas, CA (US)

( * ) Notice: Subject to any disclaimer, the term of this patent is extended or adjusted under 35 U.S.C. 154(b) by 603 days.

(21) Appl. No.: 18/354,150

(22) Filed: Jul. 18, 2023

(65) Prior Publication Data

US 2024/0134696 A1 Apr. 25, 2024
US 2024/0231923 A9 Jul. 11, 2024

Related U.S. Application Data

(60) Provisional application No. 63/380,437, filed on Oct. 21, 2022.

(51) Int. Cl.
*G06F 9/50* (2006.01)

(52) U.S. Cl.
CPC .................................. *G06F 9/5027* (2013.01)

(58) Field of Classification Search
CPC ......................... G06F 9/5027; G06F 2209/509
See application file for complete search history.

(56) References Cited

U.S. PATENT DOCUMENTS

| | | | | |
|---|---|---|---|---|
| 8,860,741 | B1 * | 10/2014 | Juffa | G09G 5/363 345/530 |
| 9,256,915 | B2 * | 2/2016 | Bourd | G06F 9/5038 |
| 9,342,384 | B1 * | 5/2016 | Lewis | G06F 9/547 |
| 9,940,194 | B2 | 4/2018 | Achtenberg | |
| 10,372,497 | B1 * | 8/2019 | Zelenov | G06F 9/54 |
| 10,592,144 | B2 | 3/2020 | Roberts | |
| 10,761,999 | B1 * | 9/2020 | Harari Shechter | H04L 9/0897 |
| 11,210,140 | B1 | 12/2021 | Gold | |
| 11,650,748 | B1 * | 5/2023 | Dubeyko | G06F 3/0664 711/154 |
| 11,755,465 | B1 * | 9/2023 | Dubeyko | G06F 11/3684 717/130 |
| 2012/0069035 | A1 * | 3/2012 | Bourd | G06F 9/54 345/557 |
| 2014/0043330 | A1 * | 2/2014 | Ceylan | G06T 11/23 345/423 |
| 2014/0043341 | A1 * | 2/2014 | Goel | G06T 1/00 345/501 |

(Continued)

*Primary Examiner* — Benjamin C Wu
(74) *Attorney, Agent, or Firm* — Patent Law Works LLP

(57) ABSTRACT

Systems and methods for offloading data storage processing tasks from a data storage device to a graphics processing unit data are described. Data storage devices may include a peripheral interface configured to connect to a host system and provide access to a host memory buffer. The data storage device may store task input data to the host memory buffer. The data storage device may notify a processor device including the graphics processing unit to initiate the storage processing task. The processor device may access the task input data from the host memory buffer and store the task output data to the host memory buffer for access by the data storage device.

20 Claims, 10 Drawing Sheets

(56) References Cited

U.S. PATENT DOCUMENTS

2014/0204102 A1* 7/2014 Rath .................... G06F 9/4401 345/522
2015/0269065 A1* 9/2015 Bourd .................... G06F 9/526 711/155
2016/0335064 A1* 11/2016 Che .................... G06F 8/4434
2017/0083998 A1* 3/2017 Acharya .................... G06T 1/60
2017/0212563 A1* 7/2017 Farazmand .................... G06F 9/5027
2018/0341547 A1* 11/2018 Bolkhovitin .................... G06F 13/28
2019/0012278 A1* 1/2019 Sindhu .................... G06F 13/4282
2019/0317880 A1* 10/2019 Herr .................... G06F 11/3409
2020/0050551 A1* 2/2020 He .................... G06F 3/0659
2020/0167291 A1* 5/2020 Asaro .................... G06F 11/0721
2020/0183738 A1* 6/2020 Champigny .................... G06F 9/5016
2020/0210243 A1* 7/2020 Li .................... G06F 9/5061
2021/0026559 A1* 1/2021 Richter .................... G06F 3/0611
2021/0200608 A1* 7/2021 Gangani .................... G06N 20/00
2021/0240524 A1* 8/2021 Gangani .................... G06F 9/5061
2022/0035530 A1* 2/2022 Vikram Singh .................... G06F 3/0659
2022/0129255 A1* 4/2022 Wang .................... G06T 1/60
2022/0129272 A1* 4/2022 Wang .................... G06F 13/28
2022/0164299 A1* 5/2022 Moshe .................... G06F 21/44
2022/0179742 A1 6/2022 Yadav
2023/0019763 A1* 1/2023 Du .................... G06T 1/20
2023/0061087 A1* 3/2023 Ferraro .................... G06F 8/451
2023/0102226 A1* 3/2023 Kim .................... G06F 3/0655 711/154
2023/0114636 A1* 4/2023 Pandurangan .................... G06F 3/0607 711/154
2023/0124665 A1* 4/2023 Hong .................... G06F 3/0631 711/154
2023/0325106 A1* 10/2023 Shveidel .................... G06F 3/0638 711/202
2023/0333983 A1* 10/2023 Bikonda .................... G06F 12/0815
2023/0376242 A1* 11/2023 Dubeyko .................... G06F 3/0604
2023/0403236 A1* 12/2023 Mesnier .................... H04L 47/2433
2024/0045592 A1* 2/2024 Jin .................... G06F 3/0658
2024/0095076 A1* 3/2024 Dubeyko .................... G06F 9/5027
2024/0134696 A1* 4/2024 Moshe .................... G06F 9/5027
2025/0383803 A1* 12/2025 Tomkins .................... G06F 3/0635

* cited by examiner

OFFLOADING DATA STORAGE DEVICE PROCESSING TASKS TO A GRAPHICS PROCESSING UNIT

TECHNICAL FIELD

The present disclosure generally relates to data storage devices offloading processing tasks to other system components and, more particularly, to offloading processing tasks to a graphics processing unit.

BACKGROUND

Some computing systems, such as storage arrays, may include multiple data storage devices supporting one or more host systems through a peripheral or storage interface bus, such as peripheral component interconnect express (PCIe), serial advanced technology attachment (SATA), or serial attached [small computer serial interface (SCSI)] (SAS). Increasingly, both host systems and data storage devices are being tasked with mathematically intensive tasks related to graphics, video processing, machine learning, and other computational tasks that benefit from massive parallelism across a large number of processing cores. Graphics processing units (GPUs) originally developed for rendering computer graphics may comprise hundreds of processing cores configured for parallel processing of large blocks of data. GPUs are increasingly present in a variety of computing system contexts, including mobile devices, personal computers, server systems, data center systems, etc., and are now used for a variety of use cases, such as machine learning or specific computational tasks.

Multi-device storage systems utilize multiple discrete data storage devices, generally disk drives (solid-state drives, hard disk drives, hybrid drives, tape drives, etc.) for storing large quantities of data. These multi-device storage systems are generally arranged in an array of drives interconnected by a common communication fabric and, in many cases, controlled by a storage controller, redundant array of independent disks (RAID) controller, or general controller, for coordinating storage and system activities across the array of drives. The data stored in the array may be stored according to a defined RAID level, a combination of RAID schemas, or other configurations for providing desired data redundancy, performance, and capacity utilization. In general, these data storage configurations may involve some combination of redundant copies (mirroring), data striping, and/or parity (calculation and storage), and may incorporate other data management, error correction, and data recovery processes, sometimes specific to the type of disk drives being used (e.g., solid-state drives versus hard disk drives).

Each storage device in a multi-device storage system may be connected to a host system through at least one high-bandwidth interface, such as PCIe, using an appropriate storage protocol for the storage device, such as non-volatile memory express (NVMe) for accessing solid state drives (SSDs) or the storage blades of all flash arrays. Some multi-device storage systems employ storage devices capable of communicating with one another and/or host systems over the interconnecting fabric and/or network fabric through the high-bandwidth interface. Such fabric-based distributed storage systems may include storage devices configured with direct memory access to enable more efficient transfer of data to and from hosts and other systems.

In some configurations, each data storage device may include several central processing units (CPUs), some of which may have multiple cores, for dedicated storage device operations like processing read/write host commands and internal tasks for managing storage media and data integrity. However, these storage device CPUs have limited power and performance capabilities compared to host system CPUs or GPU devices. In most configurations, storage device CPUs have been designed to meet the host command and background operation demands to support a target storage bandwidth and/or quality-of-service (QoS) up to some peak capacity for that storage device. For specific high performance and/or high latency tasks, storage devices may incorporate custom hardware accelerators integrated in their controller application specific integrated circuits (ASICs). But even these accelerators tend to be aligned with anticipated throughput performance and do not provide the level of computation resources present in the host CPUs or GPUs.

Increasingly, machine learning models may be being applied to storage processing tasks, including internal processing tasks such as error correction, data security, and other tasks. The training phases of these machine learning-based tasks may present a significant computational resource challenge for individual data storage devices. Similarly, heroic modes of data recovery may create computational demands that are difficult for the data storage device CPUs.

Novel systems and methods for accessing compute resources outside the data storage device and offloading computationally intensive tasks may be advantageous. A reliable way of accessing GPU resources shared with a host system may be needed.

SUMMARY

Various aspects for offloading data storage device processing tasks to a GPU, particularly using host resources, such as host memory buffers, to coordinate tasks among the data storage device, host system, and GPU, are described.

One general aspect includes a system that includes a data storage device that includes: a peripheral interface configured to connect to a host system; a storage medium configured to store host data; a direct memory access service configured to store, to a host memory buffer of the host system and through the peripheral interface, a first set of task input data and access, from the host memory buffer and through the peripheral interface, a first set of task output data; and a processing offload service configured to notify, through the peripheral interface, a processor device to initiate a first processing task on the first set of task data, where the processor device may include a graphics processing unit.

Implementations may include one or more of the following features. The system may include a peripheral bus configured for communication among the data storage device, the host system, and the processor device, and the host system may include a host processor and a host memory device that includes a set of host memory locations configured to be: allocated to the host memory buffer; accessible to the data storage device using direct memory access; and accessible to the processor device using direct memory access. The host memory buffer may be further configured with: a first subset of the set of host memory locations allocated to task input data and including the first set of task input data; a second subset of the set of host memory locations allocated to task output data and including the first set of task output data; and a third subset of the set of host memory locations allocated to a status register configured to include at least one status indicator for the first processing task. The host system may be configured to send host processing tasks to the processing device; the host system may further include a scheduling service configured to monitor availability of the graphics processing unit, determine a processor availability window for the graphical processing unit, and notify the data storage device of the processor availability window; and notifying the processor device to initiate the first processing task may be responsive to the processor availability window. The system may include the processor device and the processor device may be configured to: receive the notification to initiate the first processing task; access, using direct memory access to the host memory buffer, the first set of task input data; process, using a first set of task code for the first processing task, the first set of task input data to determine the first set of task output data; store, using direct memory access, the first set of task output data to the host memory buffer; and notify, responsive to storing the first set of task output data to the host memory buffer, the data storage device that the first processing task is complete. The processing offload service may be further configured to determine the first set of task code for the first processing task; and the notification to initiate the first processing task may include the first set of task code for the first processing task. The data storage device may further include a read channel configured for an error correction capability; the first set of task input data may include a host data block including a number of unrecoverable error correction code errors exceeding the error correction capability of the read channel in the data storage device and a set of subblocks including at least one parity subblock; the first set of task code for the first processing task may be a data recovery model that includes parallel exclusive-or operations across the set of subblocks; and the first set of task output data may be based on the parallel exclusive-or operations. The data storage device may further include at least one operation monitor that includes an operating model configured to trigger an operating state change responsive to an operating threshold; the operating model may be based on a network of node coefficients determined by machine learning; the first set of task input data may include operational data from the data storage device at a first plurality of time points; the first set of task code for the first processing task may be a machine learning model for determining node coefficient values for the network of node coefficients; and the first set of task output data may include the node coefficient values for the network of node coefficients. The processing offload service may be further configured to: periodically determine, based on the at least one operation monitor, that a retraining condition is met; periodically determine, responsive to the retraining condition being met, additional sets of task input data from operational data from the data storage device at additional pluralities of time points after the first plurality of time points; periodically initiate, based on the additional sets of task input data, additional processing tasks based on the machine learning model for determining the node coefficient values for the network of node coefficients; periodically determine updated node coefficient values based on the node coefficient values determined by the processor device; and periodically update the operating model based on the updated node coefficient values for a most recent retraining condition. The operating model may include a host operations validator configured to monitor a flow of data between the data storage device and the host memory buffer to enforce valid commands to the data storage device; the operating threshold may include a command validity threshold by which the operating state rejects invalid commands; and the operational data may include a set of log data, collected for a series of time points in an operating window, for host commands received by the data storage device and direct memory access commands sent to the host system by the data storage device. The operating model may include a device under attack operating model configured to monitor device security parameters for the data storage device; the operating threshold may include a device security threshold by which the operating state responds to a security threat; and the operational data may include a set of log data, collected for a series of time points in an operating window, for device security parameters.

Another general aspect includes a computer-implemented method that includes: storing, by a data storage device and to a host memory buffer of a host system, a first set of task input data; notifying a processor device to initiate a first processing task on the first set of task data in the host memory buffer, where the processor device may include a graphics processing unit; and accessing, by the data storage device and from the host memory buffer, a first set of task output data.

Implementations may include one or more of the following features. The computer-implemented method may include: sending, by the host system, host processing tasks to the processing device; monitoring, by the host system, availability of the graphics processing unit; determining, by the host system, a processor availability window for the graphical processing unit; and notifying the data storage device of the processor availability window, where notifying the processor device to initiate the first processing task is responsive to the processor availability window. The computer-implemented method may include: receiving, by the processing device, the notification to initiate the first processing task; accessing, by the processing device and using direct memory access, the first set of task input data from the host memory buffer; processing, by the processing device and using a first set of task code for the first processing task, the first set of task input data to determine the first set of task output data; storing, by the processing device and using direct memory access, the first set of task output data to the host memory buffer; and notifying, responsive to storing the first set of task output data to the host memory buffer, the data storage device that the first processing task is complete. The computer-implemented method may include: determining, by the data storage device, a number of unrecoverable error correction code errors in a host data block, where the number of unrecoverable error correction code errors in the host data block exceed an error correction capability of a read channel in the data storage device, the host data block includes a set of subblocks including at least one parity subblock, and the host data block is the first set of task input data; and executing, by the processing device and based on the first set of task code for a data recovery model, parallel exclusive-or operations across the set of subblocks, where the first set of task output data is based on the parallel exclusive-or operations. The computer-implemented method may include: triggering, by an operating model in the data storage device, an operating state change responsive to an operating threshold, where the operating model is based on a network of node coefficients determined by machine learning; collecting, by the data storage device, operational data from the data storage device at a first plurality of time points, where the first set of task input data includes the operational data; executing, by the processing device, the first set of task code for a machine learning model to determine node coefficient values for the network of node coefficients, where the first set of task output data includes the node coefficient values for the network of node coefficients. The computer-implemented method may include:

periodically determining, based on the operating model, that a retraining condition is met; periodically determining, responsive to the retraining condition being met, additional sets of task input data from operational data from the data storage device at additional pluralities of time points after the first plurality of time points; periodically initiating, based on the additional sets of task input data, additional processing tasks based on the machine learning model for determining the node coefficient values for the network of node coefficients; periodically determining updated node coefficient values based on the node coefficient values determined by the processor device; and periodically updating the operating model based on the updated node coefficient values for a most recent retraining condition. The computer-implemented method may include: monitoring, using a host operations validator operating model in the data storage device, a flow of data between the data storage device and the host memory buffer to enforce valid commands to the data storage device; collecting, by the data storage device, the operational data that includes a set of log data for a series of time points in an operating window for host commands received by the data storage device and direct memory access commands sent to the host system by the data storage device; comparing, using the network of node coefficients for the host operations validator operating model, the operational data to a command validity threshold as the operating threshold; and entering, based on the operational data meeting the command validity threshold, an operating state configured to reject invalid commands. The computer-implemented method may include: monitoring, using a device under attack operating model, device security parameters for the data storage device; collecting, by the data storage device, the operational data that includes a set of log data for a series of time points in an operating window for the device security parameters; comparing, using the network of node coefficients for the device under attack operating model, the operational data to a device security threshold as the operating threshold; and entering, based on the operational data meeting the device security threshold, an operating state corresponding to a security threat.

Still another general aspect includes a data storage device that includes: a peripheral interface configured to connect to a host system; a storage medium configured to store host data; means for storing, to a host memory buffer of the host system, a first set of task input data; means for initiating a first processing task on the first set of task data in the host memory buffer by a processor device, where the processor device may include a graphics processing unit; and means for accessing, from the host memory buffer, a first set of task output data.

The various embodiments advantageously apply the teachings of storage devices and/or multi-device storage systems to improve the functionality of such computer systems. The various embodiments include operations to overcome or at least reduce the issues previously encountered in storage arrays and/or systems and, accordingly, are more reliable and/or efficient than other computing systems. That is, the various embodiments disclosed herein include hardware and/or software with functionality to improve offloading of storage processing tasks from a data storage device to a GPU using a host memory buffer as an intermediary. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
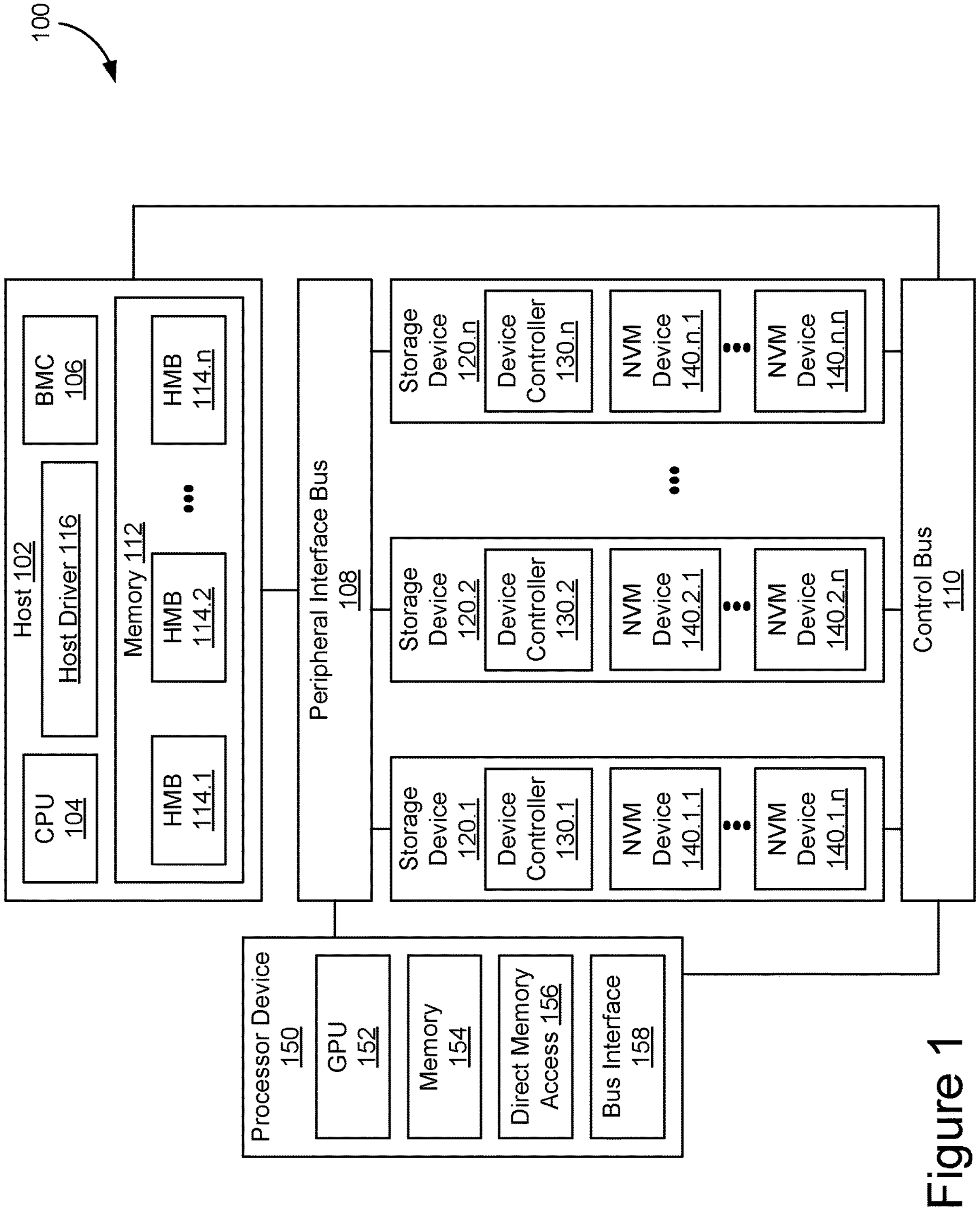
FIG. 1 schematically illustrates a multi-device storage system with a peripheral interface bus connecting to a GPU processor device.

FIG. 1 shows an embodiment of an example data storage system 100 with multiple data storage devices 120 interconnected by peripheral interface bus 108 to host 102 and processor device 150. While some example features are illustrated, various other features have not been illustrated for the sake of brevity and so as not to obscure pertinent aspects of the example embodiments disclosed herein. To that end, as a non-limiting example, data storage system 100 includes one or more data storage devices 120 (also sometimes called information storage devices, storage devices, disk drives, or drives). In some embodiments, storage devices 120 may be configured in a server or storage array blade or similar storage unit for use in data center storage racks or chassis. Storage devices 120 may interface with one or more hosts 102 and provide data storage and retrieval capabilities for or through those host systems. Storage devices 120 and/or host 102 may interface with one or more processor devices 150 for offloading processing tasks that benefit from the parallel processing of a graphics processing unit (GPU) 152. In some embodiments, storage devices 120 may be configured in a storage hierarchy that includes storage nodes, storage controllers, and/or other intermediate components between storage devices 120 and host 102. For example, each storage controller may be responsible for a corresponding set of storage nodes and their respective storage devices connected through a corresponding backplane network, though only storage devices 120 and host 102 are shown.

In the embodiment shown, a number of storage devices 120 are attached to a common peripheral interface bus 108 for host communication. For example, storage devices 120 may include a number of drives arranged in a storage array, such as storage devices sharing a common rack, unit, or blade in a data center or the SSDs in an all flash array. In some embodiments, storage devices 120 may share a back-plane network, network switch(es), and/or other hardware and software components accessed through peripheral interface bus 108 and/or control bus 110. For example, storage devices 120 may connect to peripheral interface bus 108 and/or control bus 110 through a plurality of physical port connections that define physical, transport, and other logical channels for establishing communication with the different components and subcomponents for establishing a communication channel to host 102. In some embodiments, peripheral interface bus 108 may provide the primary host interface for storage device management and host data transfer, and control interface bus 110 may include limited connectivity to the host for low-level control functions.

In some embodiments, storage devices 120 may be referred to as a peer group or peer storage devices because they are interconnected through peripheral interface bus 108 and/or control bus 110. In some embodiments, storage devices 120 may be configured for peer communication among storage devices 120 through peripheral interface bus 108, with or without the assistance of host 102. For example, storage devices 120 may be configured for direct memory access using one or more protocols, such as non-volatile memory express (NVMe), remote direct memory access (RDMA), NVMe over fabric (NVMeOF), etc., to provide command messaging and data transfer between storage devices using the high-bandwidth storage interface and peripheral interface bus 108.

In some embodiments, storage devices 120 may be configured for communication using multi-master discovery and messaging compliant with a low-bandwidth interface standard. For example, storage devices 120 may be configured for packet-based messaging through control bus 110 using a low-bandwidth bus protocol, such as inter-integrated circuit (I2C), improved inter-integrated circuit (I3C), system management bus (SMBus), etc. Storage devices 120 may be interconnected by a common control bus to provide a low-bandwidth communication channel with host 102 and other system components to assist with power management, discovery, and access to external resources, such as temperature sensors, fan controllers, light emitting diode (LED) indicators, etc. For example, control bus 110 may connect storage devices 120 to a baseboard management controller (BMC) for monitoring the physical state of storage devices 120 for host 102. Storage devices 120 may be defined as peer storage devices based on their connection to a shared control bus 110.

In some embodiments, data storage devices 120 are, or include, solid-state drives (SSDs). Each data storage device 120.1-120.*n* may include a non-volatile memory (NVM) or device controller 130 based on compute resources (processor and memory) and a plurality of NVM or media devices 140 for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels). In some embodiments, data storage devices 120 may each be packaged in a housing, such as a multi-part sealed housing with a defined form factor and ports and/or connectors for interconnecting with peripheral interface bus 108 and/or control bus 110.

In some embodiments, a respective data storage device 120 may include a single medium device while in other embodiments the respective data storage device 120 includes a plurality of media devices. In some embodiments, media devices include NAND-type flash memory or NOR-type flash memory. In some embodiments, data storage device 120 may include one or more hard disk drives (HDDs), hybrid drives, tape drives, or other data storage devices storing host data to a non-volatile storage medium. In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 120 includes a device controller 130, which includes one or more processing units (also sometimes called CPUs or processors or microprocessors or microcontrollers) configured to execute instructions in one or more programs. In some embodiments, the one or more processors are shared by one or more components within, and in some cases, beyond the function of the device controllers. Media devices 140 are coupled to device controllers 130 through connections that typically convey commands in addition to data, and optionally convey metadata, error correction information and/or other information in addition to data values to be stored in media devices and data values read from media devices 140. Media devices 140 may include any number (i.e., one or more) of memory devices including, without limitation, non-volatile semiconductor memory devices, such as flash memory device(s).

In some embodiments, media devices 140 in storage devices 120 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which may be a subunit of a page. That is, a block includes a plurality of pages, each page contains a plurality of sectors or codewords, and each sector or codeword is the minimum unit of data for reading data from the flash memory device. In some embodiments, each codewords for error correction code (ECC) decoding may be configured as a page. In some configurations, a data block may include a plurality of subblocks, such as pages, that are configured for parity-based error recovery across the plurality of subblocks. For example, the data block may include a plurality of pages including host data and at least one page configured as a parity page to store XOR-based parity information based on exclusive-or processing across the plurality of host pages. Each page may be decoded using ECC processing and XOR-based data recovery may be reserved for error recovery when one or more codewords fail to decode completely due to unrecoverable ECC (UECC) errors exceeding the error correction capability of the read channel code rate.

A data unit may describe any size allocation of data, such as host block, data object, sector, page, multi-plane page, erase/programming block, media device/package, etc. Storage locations may include physical and/or logical locations on storage devices 120 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 120, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks.

In some embodiments, host or host system 102 may be coupled to data storage system 100 through a network interface that is part of host fabric network that includes peripheral interface bus 108 as a host fabric interface. In some embodiments, multiple host systems 102 (only one of which is shown in FIG. 1) are coupled to data storage system 100 through the fabric network, which may include a storage network interface or other interface capable of supporting communications with multiple host systems 102. The fabric network may include a wired and/or wireless network (e.g., public and/or private computer networks in any number and/or configuration) which may be coupled in a suitable way for transferring data. For example, the fabric network may include any means of a conventional data communication network such as a local area network (LAN), a wide area network (WAN), a telephone network, such as the public switched telephone network (PSTN), an intranet, the internet, or any other suitable communication network or combination of communication networks. In some embodiments, peripheral interface bus 108 and the respective peripheral interfaces of host 102, storage devices 120, and processor device 150 may comply with peripheral component interconnect express (PCIe) peripheral interface standards.

Host system 102, or a respective host in a system having multiple hosts, may be any suitable computer device, such as a computer, a computer server, a laptop computer, a tablet device, a netbook, an internet kiosk, a personal digital assistant, a mobile phone, a smart phone, a gaming device, or any other computing device. Host system 102 is sometimes called a host, client, or client system. In some embodiments, host system 102 is a server system, such as a server system in a data center, or a storage system, such as a storage array in a data center. In some embodiments, the one or more host systems 102 are one or more host devices distinct from a storage controller or storage node housing the plurality of storage devices 120. The one or more host systems 102 may be configured to store and access data in the plurality of storage devices 120.

Host system 102 may include one or more central processing units (CPUs) 104 for executing compute operations or instructions for accessing storage devices 120 through peripheral interface bus 108. In some embodiments, CPU 104 may include a processor and be associated with operating memory (not shown) for executing both storage operations and a storage interface protocol compatible with peripheral interface bus 108 and storage devices 120. In some embodiments, a separate storage interface unit (not shown) may provide the storage interface protocol and related processor and memory resources. From the perspective of storage devices 120, peripheral interface bus 108 may be referred to as a host interface bus and provides a host data path between storage devices 120 and host 102.

Host system 102 may include a BMC 106 configured to monitor the physical state of host 102, storage devices 120, processor device 150, and/or other components of data storage system 100. In some embodiments, BMC 106 may include processor, memory, sensor, and other resources integrated in BMC 106 and/or accessible over control bus 110. BMC 106 may be configured to measure internal variables within a housing, adjacent components, and/or from the components themselves within host 102, data storage system 100, and/or processor device 105, such as temperature, humidity, power-supply voltage, fan speeds, communication parameters, and/or operating system (OS) functions. BMC 106 may enable systems and components to be power cycled or rebooted as needed through control signals over control bus 110. In some embodiments, BMC 106 may be configured to receive status communication from storage devices 120 and/or processor device 150 through control bus 110 during boot cycles, prior to initialization of host communication through peripheral interface bus 108.

Host system 102 may include a memory 112 configured to support a plurality of host memory buffers 114 allocated to storage devices 120. For example, memory 112 may include one or more dynamic random access memory (DRAM) devices for use by storage devices 120 for command, management parameter, and/or host data storage and transfer. In some embodiments, storage devices 120 may be configured for direct memory access (DMA), such as using remote direct memory access (RDMA) protocols, over peripheral interface bus 108 to access and use the host memory buffer 114 allocated to that storage device. In some embodiments, host memory buffers 114 may be allocated to each storage device 120 such that each storage device receives a dedicated set of memory locations with known addresses. In some embodiments, host memory buffers 114 may be dynamically allocated as each storage device 120 is initialized and/or the memory size allocated to that storage device may fluctuate within an acceptable set of buffer size limits. In some embodiments, storage devices 120 may use the host memory buffer for caching host data mapping information, such as recent or heavily used LBAs and/or corresponding FTL data. In some embodiments, storage devices 120 may be configured to use a portion of their allocated host memory buffer 114 as an intermediary for offloading processing tasks to processor device 150. For example, host memory buffer 114 may receive task input data from storage devices 120, task output data from processor device 150, and status and/or notification information for communication between storage device 120 and processor device 150. Processor device 150 may include DMA protocols and have access mapped to host memory buffers 114 for one or more data storage devices 120 by the host 102.

Host system 102 may include a host driver 116 configured to manage storage device and/or processor device access to host memory buffers 114 and/or other host system resources.

For example, host system 102 may include memory resources (e.g., host buffer memory), processor resources (e.g., CPU core), and/or specialized resources (e.g., error correction coded engines, computational accelerators, etc.) that are configured for access by storage devices and/or processor devices over peripheral interface bus 108 using an access protocol and a unique set of access parameters allocated to that storage device or processor device. Host driver 116 may be configured to manage the discovery, allocation, authentication, and use of host resources by storage devices 120 and/or processor device 150. For example, host driver 116 may comply with NVMe and/or RDMA standards for enabling storage device and processor device access to host memory buffers 114. Host driver 116 may allocate a set of host buffer memory locations to each storage device and maintain a memory allocation table or similar data structure for identifying which memory locations are allocated to which storage device. Host driver 116 may similarly allocate and mediate access to those same memory locations by processor device 150 for processing offloaded processing tasks from the respective storage devices.

Processor device 150 may include GPU 152 for providing parallel computational capabilities to host 102 and/or storage devices 120 for offloading processing tasks. For example, GPU 152 may include hundreds or thousands of processor cores configured for parallel operations. GPU 152 may be configured for greater throughput than host CPU 104 or the processors of device controllers 130 in storage devices 120. GPU 152 may execute parallel processing of input task data using specialized software for converting CPU functions to GPU functions with a parallel processing structure. For example, GPU 152 may receive task code for an offloaded processing task comprised of a set of software code defining the GPU task processing for the target task input data, such as a set of parallel functions targeting various subunits of the task input data. In some embodiments, processor device 150 may receive the task code for a processing task from host 102 or the storage device offloading the processing task as part of a notification to initialize execution of the processing task.

Processor device 150 may include a memory 154 for receiving input task data and task code, storing intermediate data during processing, and buffering output task data until it can be stored back to host memory buffers 114. For example, memory 154 may include one or more DRAM devices for use by GPU 152. In some embodiments, memory 154 may also include non-volatile memory storing firmware, configuration data, and/or other operating information for processor device 150. For example, memory 154 may include software instructions executed by GPU 152 for receiving, processing, and outputting data for offloaded processing tasks, such as messaging, processing queue management, task code handling, memory management, direct memory access, message authentication and security, and other functions. In some embodiments, processor device 150 may be configured with a direct memory access protocol 156, such RDMA protocols, for accessing host memory buffers 114 over peripheral interface bus 108 to access. For example, processor device 150 may be configured to use host memory buffers 114 allocated to the storage devices to access task input data from storage devices 120 and store task output data after task processing is complete. Processor device 150 may include a bus interface 158 configured for communication over peripheral interface bus 108 and/or control bus 110. In some embodiments, bus interface 158 may be configured similarly to the peripheral bus interface and/or control bus interface that is further described below with regard to FIG. 5.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

Figure 2:
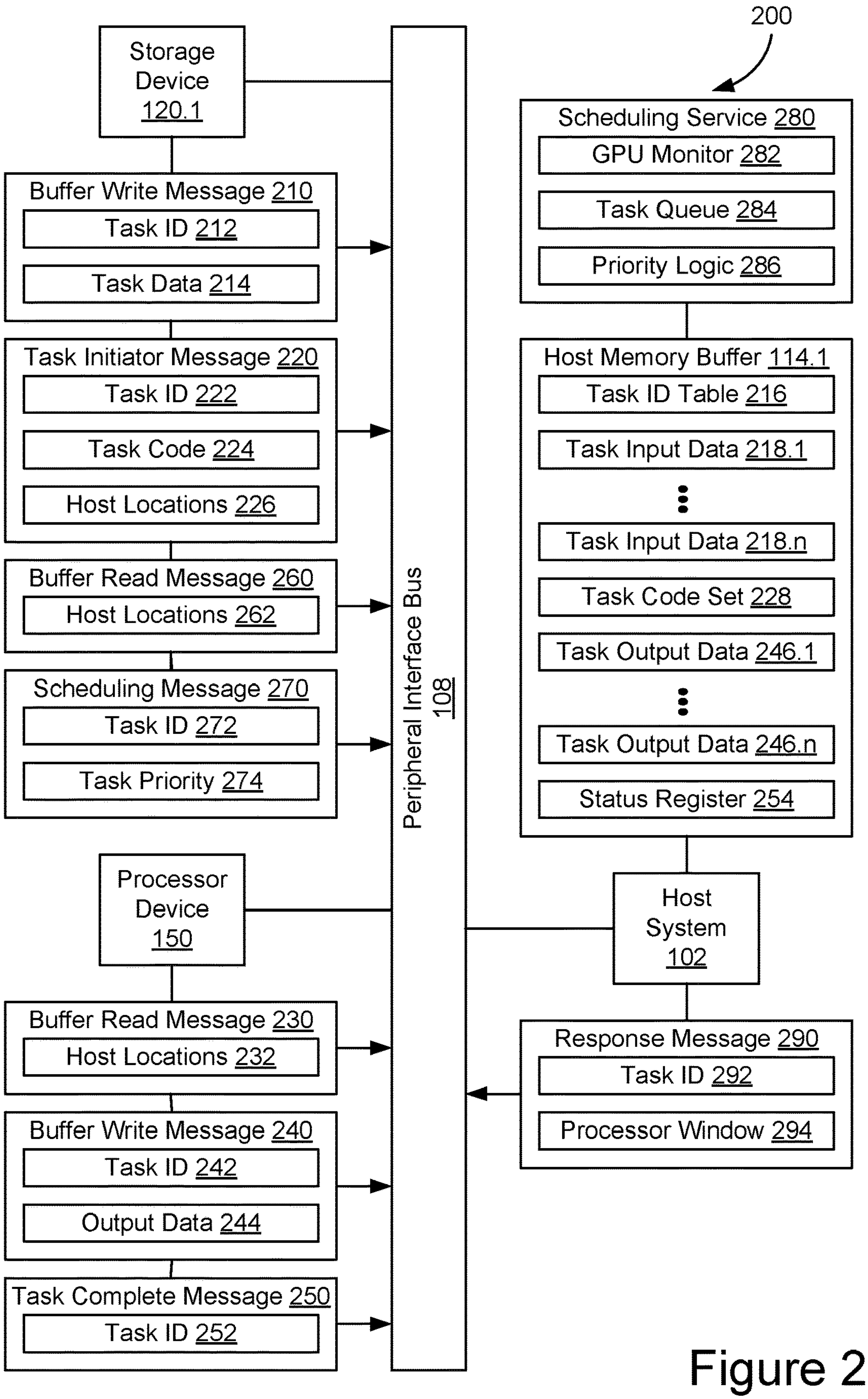
FIG. 2 schematically illustrates a storage task offloading architecture that may be used by the multi-device storage system of FIG. 1.

FIG. 2 shows a schematic representation of an example storage system 200, such as multi-device data storage system 100 in FIG. 1, configured for offloading processing tasks from storage device 120.1 to processor device 150 using host memory buffer 114.1 as an intermediary. In some embodiments, communication among storage device 120.1, processor device 150, and/or host system 102 is made through peripheral interface bus 108 using only DMA to host memory buffer 114.1 and without direct communication between storage device 120.1 and processor device 150. In some embodiments, communication among storage device 120.1, processor device 150, and/or host system 102 may include a combination of DMA to host memory buffer 114.1 and direct messages among components through peripheral interface bus 108. While each example message is described as a single communication between two or more components, they may be embodied in multiple messages, such as multiple put or get operations to host memory buffer 114.1 using the DMA protocol.

In some embodiments, storage device 120.1 may determine a processing task to be offloaded to processor device 150, such as an error recovery processing task, a machine learning training task, or another internal operation processing task that benefits from high-volume parallel processing. Storage device 120.1 may start offloading the processing task by writing the task input data to host memory buffer 114.1. For example, storage device 120.1 may send buffer write message 210 to host memory buffer 114.1 using DMA protocols to store a task identifier (ID) 212 and task data 214 in task input data 218.1. In some embodiments, storage system 200 may use task identifiers to manage multiple offloaded processing tasks in host memory buffer 114.1 during an operating period. For example, host memory buffer 114.1 may include a task identifier lookup table 216 including table entries corresponding to each task identifier, such as task identifier 212, and associating the task identifier with related storage locations in host memory buffer 114.1, such as corresponding task input data 218, task code set 228, task output data 246, and status register 254. In some embodiments, task input data for a particular processing task may include the aggregation of data from multiple time points and storage device 120.1 may repeatedly send buffer write message 210 with the same task ID 212 and a sequence of task data subsets in task data 214. In some configurations, storage device 120.1 may be configured to store task data for a plurality of processing tasks to host memory buffer 114.1, using different task identifiers and/or different allocated memory locations in host memory buffer 114.1 to manage task input data 218.1-218.*n* for different processing tasks.

Responsive to all of the task input data for a particular task or task identifier being stored to host memory buffer 114.1, storage device 120.1 may send a task initiator message 220 for initiating task processing by processor device 150. In some embodiments, task initiator message 220 may include task identifier 222 for the target processing task, task code 224 comprising the set of GPU-compliant software code for parallel processing the task input data, and host locations 226 identifying the storage locations in host memory buffer 114.1 storing the task input data. In some configurations, host locations 226 may also include storage location indicators for receiving task output data from the processing task, and a status register location (e.g., in status register 254) for managing status indicators and status communication among the components. In some configurations, host locations 226 corresponding to task identifier 222 may be stored in host memory buffer 114.1, such as in task identifier lookup table 216, and may not be included task initiator message 220. For example, task identifier 222 may be an index value for determining host locations 226 from data in host memory buffer 114.1 and repeating host locations 226 in task initiator message 220 may be unnecessary. In some embodiments, task initiator message 220 may be directed to processor device 150 using messaging protocols through peripheral interface bus 108 and processor device 150 may directly receive task initiator message 220 for notifying processor device 150 to initiate processing of the task corresponding to task identifier 222. For example, processor device 150 may receive task initiator message 220 from storage device 120.1 and parse the message to determine task identifier 222, task code 224, and host locations 226. In some embodiments, task initiator message 220 may be directed to host memory buffer 114.1 to store task code 224 in task code set 228 and update status register 254 to initiate processing. For example, task initiator message 220 may update a task identifier lookup table entry for task ID 222 with final host locations 226, store task code 224 to task code set 228, and update status register 254 for task ID 222 to an initiate/request processing status. Processor device 150 (and/or host system 102) may be configured to periodically check status register 254 to identify offloaded tasks ready for processing and use the corresponding task identifier to retrieve task code 224 from task code set 228 and host locations 226 from task identifier lookup table 216.

Responsive to processor device 150 receiving notification to initiate the offloaded processing task, processor device 150 may initiate processing by accessing task input data 218 in host memory buffer 114.1. For example, processor device 150 may send a buffer read message 230 to host system 102 to access host locations 232 containing task input data 218.1 for the task to be processed. In some embodiments, processor device 150 may parse a task identifier from a task initiation notification, such as task initiator message 220 or an initiate/request processing status entry in status register 254. The task identifier may be used to determine host locations 232 for the corresponding task input data 218 from task identifier lookup table 216. In some embodiments, processor device 150 may parse host locations 232 directly from task initiator message 220. Buffer read message 230 may include one or more get operations to access task input data 218 for the processing task and store it into local memory in processor device 150 for processing.

Responsive to processor device 150 accessing the task input data corresponding to the processing task, processor device 150 may process the task input data using a corresponding set of task code for the GPU. For example, processor device 150 may parse task code 224 from task initiator message 220 or access task code set 228 from host memory buffer 114.1 using a get operation in another buffer read message similar to buffer read message 230. As processor device 150 processes the task input data it may generate task output data to be written to host memory buffer 114.1. For example, processor device 150 may generate and send a buffer write message 240 to host memory buffer 114.1 including task identifier 242 and output data 244. The GPU of processor device 150 may process task input data 218.1 from host memory buffer 114.1 using the corresponding set of task code and generate output data 244 to be stored to task output data 246.1. In some configurations, processor device 150 may put output data 244 to task output data storage locations in host memory buffer as it is processed. In some configurations, output data 244 may be buffered and/or aggregated in local memory of processor device 150 before being written to host memory buffer 114.1. For some tasks, processor device 150 may calculate and store intermediate data results from processing task input data in local memory and/or to host memory buffer 114.1 and subsequently or iteratively process those intermediate results to generate output data 244. For example, the processing task may comprise a map-reduce function where map operations are processed in parallel to generate intermediate results that are then processed through the reduce operations to generate output data 244. Similarly, machine learning training algorithms may generate intermediate results for each iteration until all training data is processed and/or an exit condition is met for the training processing.

Responsive to completion of data processing, processor device 150 may send a task complete message 250 to host system 102 and/or storage device 120.1. For example, task complete message 250 may include task identifier 252 for the completed offloaded processing task. In some embodiments, task complete message 250 may be sent to storage device 120.1 and/or host system 102 using a messaging protocol through peripheral interface bus 108. In some embodiments, task complete message 250 may update one or more values in host memory buffer 114.1, such as a status value for task ID 252 in status register 254. Storage device 120.1 and/or host system 102 may periodically check status register 254 for status changes to receive notification of processor device 150 completing a previously initiated processing task. Responsive to notification of task processing completion, storage device 120.1 may use a buffer read message 260 to access the corresponding task output data. For example, buffer read message 260 may include a get operation targeting host locations 262 containing task output data 246.1. Storage device 120.1 may access task output data 246 and store it to local memory for completing internal operations, such as completing decoding and response to a host read operation or updating an operating model for internal operations.

In some embodiments, host system 102 may also use processor device 150 for offloading processing tasks and may be configured to coordinate the use of processor device 150 between itself and one or more storage devices 120, such as storage device 120.1. For example, when storage device 120.1 has a processing task for offload, it may send scheduling message 270 to host system 102 to determine when the offload task may be initiated. In some embodiments, scheduling message 270 may include a task identifier 272 and a task priority 274. For example, task ID 272 may correspond to an offload task with complete task input data stored in host memory buffer 114.1. Task priority 274 may include a priority indicator to enable host system 102 to determine whether and when to allow storage device 120.1 to use the processing capabilities of processor device 150. For example, task priority 274 may indicate an immediate processing task, such as offloading error recovery for a pending host read command, or a lower priority task, such as periodic retraining of a machine learning-based operation model. In some embodiments, scheduling message 270 may be directed to modifying status register 254 to indicate the processing task for task ID 272 is ready for processing, with or without storing a task priority value.

Host system 102 may include a scheduling service 280, such as one or more scheduling functions in a host driver. Scheduling service 280 may include a GPU monitor 282 configured to monitor the availability of processor device 150 and its GPU processing capabilities. For example, GPU monitor 282 may query or receive periodic updates from processor device 150 with processing resource availability indicators, such as busy, processing queue depth, idle, or similar indications of processor availability. In some embodiments, such as where host system 102 may have sole control of processor device 150 and/or a known allocation of its processing capability, GPU monitor 282 may monitor processing tasks initiated with processor device 150 based on completion status, such as status indicators in status register 254. Scheduling service 280 may also include a task queue for offload processing tasks. For example, task queue 184 may include an array of task identifiers and priority indicators for ordering pending processing tasks. Scheduling service 280 may include priority logic 286 for organizing and/or selecting a next task from task queue 284. For example, task queue 284 may be configured for first-in-first-out (FIFO) processing and, in some embodiments, allow for insertion of higher priority processing tasks ahead of other tasks in the FIFO order. In some embodiments, priority logic 286 may receive or assign a priority to each offload processing task from host system 102 and one or more storage devices 120 and insert each processing task into task queue 284 according to the priority. In some embodiments, priority logic 288 may be configured to estimate or predict availability of processor device 150 for pending processing tasks in task queue 284. In some embodiments, scheduling service 280 may use status indicators in states register 254 to determine pending processing tasks. For example, scheduling service 180 may monitor status register 254 for task identifiers with status indicators of ready to add to task queue 284 and, similarly, remove pending tasks when the status indicator indicates processing complete. In some embodiments, scheduling service 280 may be configured to operate based on status register 254 without parsing scheduling message 270.

Responsive to a storage device offload processing task being selected or scheduled for processing, host system 102 may send a response message 290 to storage device 120.1. For example, responsive to scheduling message 270, scheduling service 280 may add task ID 272 to task queue 284 using priority logic 286 and determine when processor device 150 is available for processing the task. In some embodiments, response message 290 may be sent when scheduling service 280 determines that processor device 150 is available or idol to indicate that storage device 120.1 should immediately initiate processing. In some embodiments, scheduling service 280 may project future processor windows during which processor device 150 may be available for processing. For example, response message 290 may include both task identifier 292 to indicate the corresponding processing task and processor window 294 specifying a time window during which storage device 120.1 may initiate task processing. In some configurations, host system 102 may be configured to use a change in status register 254 to indicate scheduling of a processing task. For example, a ready task status indicator may be changed to an initiate task status indicator and storage device 120.1 and/or processor device 150 may respond to the status change in response to checking status register 254. In some configurations, host system 102 may notify processor device 150 to initiate processing based on scheduling message 270 without sending response message 290 to storage device 120.1.

Figure 3:
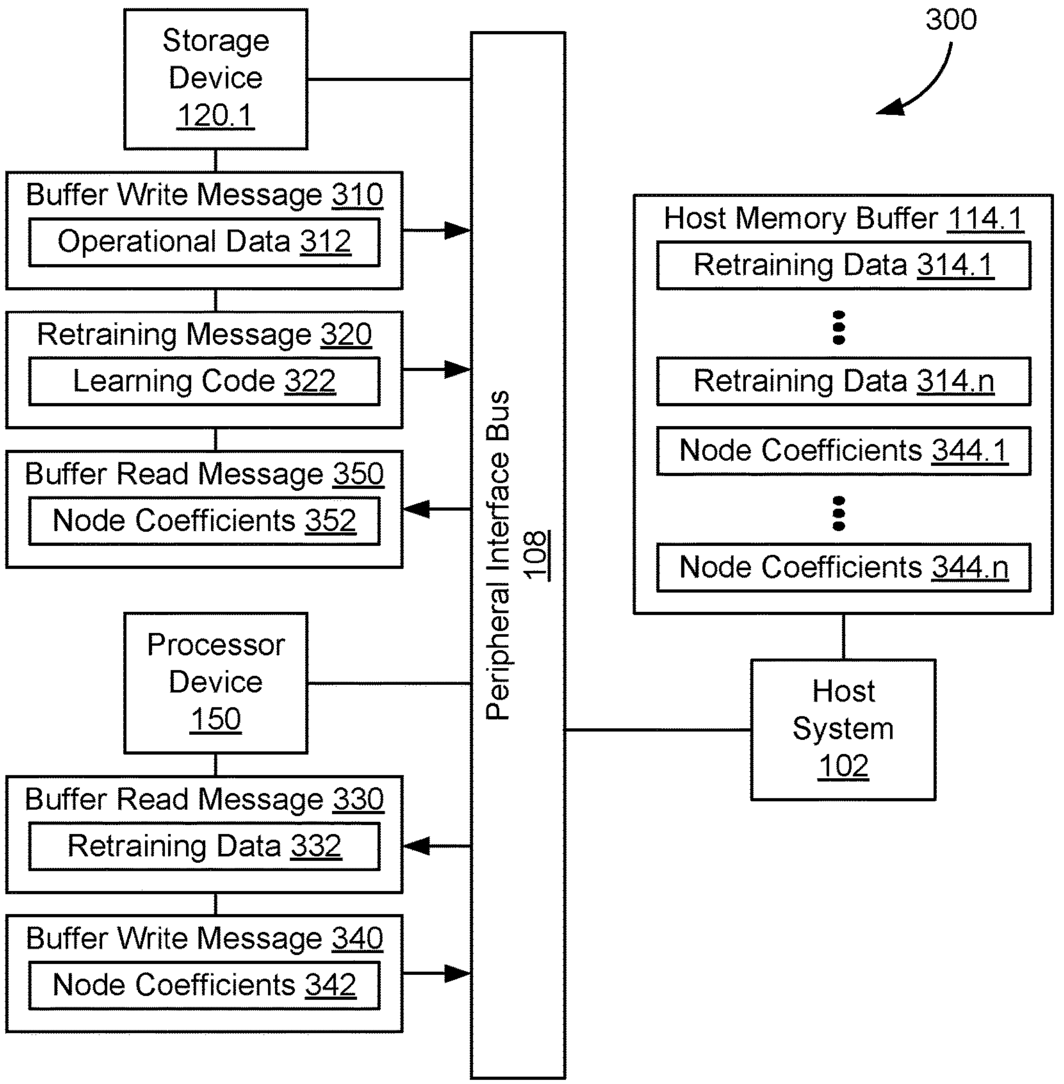
FIG. 3 schematically illustrates a machine learning offloading architecture that may be used by the multi-device storage system of FIG. 1.

FIG. 3 shows a schematic representation of an example storage system 300, such as multi-device data storage system 100 in FIG. 1, configured for offloading machine learning processing tasks from storage device 120.1 to processor device 150 using host memory buffer 114.1 as an intermediary. In some embodiments, storage system 300 may use components and communication similar to those described with regard to storage system 200 in FIG. 2. In some embodiments, storage system 300 may use a more streamlined, schedule-based system for periodically updating node coefficient values for one or more machine learning-based operating models with reduced messaging and/or less interactive/dynamic scheduling. In some configurations, a plurality of storage devices 120 and/or host system 102 may use similar configurations to storage device 120.1 for managing periodic retraining of machine learning operating models using processor device 150.

Storage device 120.1 may include one or more operating models, such as a host command validator model, device under attack model, or other internal operating model, that are based on machine learning to determine node coefficients for making periodic internal state change decisions during operation of the storage device. Run-time decisions may be made by an operations monitor based on processing operational data through the operating model and comparing the output of the operating model to an operating threshold value. The same operational data may be stored or sampled and stored for use in retraining the machine learning model on a periodic basis. In some embodiments, the operation monitor may include a feedback mechanism for evaluating state change decisions made and/or missed using the current set of node coefficients and the corresponding operational data from the time points at which the state change decisions were made may be used to select sets of operational data for retraining purposes. For example, each time a state change decision is made, such as rejecting host commands or initiating a security mode, host system 102 (or a user thereof) may provide feedback to storage device 120.1 about whether the state change decision was correct or not. Storage device 120.1 may collect operational data during an operating window and including operational data collected at a series of time points. This aggregated operational data may form at least a portion of a retraining data set for the next retraining process for the operating model. Storage device 120.1 may include one or more retraining conditions, such as elapsed operating time, threshold number of operations, number of state changes and/or incorrect state changes, etc., for triggering a retraining process.

Responsive to determining a retraining condition is met, storage device 120.1 may determine the set of operational data to be used for retraining. For example, the retraining data set may include operational data accumulated for time points since the prior training and the new data may be combined with prior training data to form a retraining data set. Storage device 120.1 may send a buffer write message 310 to write operational data 312 to retraining data 314.1 in host buffer memory 114.1. For example, buffer write message 310 may be a put operation to host memory buffer 114.1. In some embodiments, storage device 120.1 may aggregate the set of operational data 312 from multiple time points in a local memory before writing operational data 312 to host memory buffer 114.1. In some embodiments, storage device 120.1 may periodically (e.g., at a series of time points) send operational data 312 to host memory buffer 114.1 as a subset of retraining data 314.1. For example, each time storage device 120.1 determines a sample set of operational data to be used for future retraining, storage device 120.1 may generate buffer write message 310 to add the new sample set of operational data to retraining data 314.1 such that retraining data 314.1 is aggregated in host memory buffer 114.1 over a series of time points. This series of buffer write messages may precede determination that the retraining condition has been met.

Responsive to the retraining condition has been met, storage device 120.1 may send a retraining message 320 to initiate retraining of the node coefficients by processor device 150. For example, retraining message 320 may be sent to processor device 150 and/or host memory buffer 114.1 containing learning code 322 corresponding to the set of task code for executing the retraining. Learning code 322 may include GPU-compatible instructions for processing a machine learning algorithm, training constant, and cost function for the operating model and, in some cases, prior node coefficient values to seed the retraining operation. In some embodiments, learning code 322 may be stored to host memory buffer 114.1 for access by processor device 150.

Responsive to receiving retraining message 320, processor device 150 may access retraining data 314 for the retraining processing task. For example, processor device 150 may send buffer read message 330 to host memory buffer 114.1 to access retraining data 314. Processor device may store retraining data 332 to local memory for processing by the GPU. For example, buffer read message 330 may be a get operation to the storage location in host memory buffer 114.1 for retraining data 314.1. In some embodiments, processor device 150 may also use a get operation to retrieve learning code 322 from host memory buffer 114.1 if it was not sent directly to processor device 150 in retraining message 320. Processor device 150 may process retraining data 332 using learning code 322 to determine an updated set of node coefficients. For example, processor device 150 may use parallel processing of retraining data 332 using the machine learning algorithm, training constant, and cost function in learning code 322 to determine a set of node coefficients for the operating model. Processor device 150 may store the updated node coefficients back to host memory buffer 114.1. For example, processor device 150 may send buffer write message 340 to host memory buffer 114.1 to store node coefficients 342 as node coefficients 344.1. In some embodiments, processor device 150 may also notify storage device 120.1 that processing is complete and updated node coefficients 344.1 are available in host memory buffer 114.1.

Responsive to retraining processing being complete, storage device 120.1 may access node coefficients 344.1 from host memory buffer 114.1. For example, storage device 120.1 may send buffer read message 350 to get node coefficients 352 from node coefficients 344.1. Node coefficients 352 may be stored locally by storage device 120.1 and used to update the node coefficient values of the operating model for future run-time processing. For example, the prior set of node coefficient values may be replaced with the updated set of node coefficient values from buffer read message 350. In some embodiments, retraining may be executed periodically over the operating life of storage device 120.1 based on different sets of retraining data 314.1-314.*n* and resulting in corresponding updated sets of node coefficients 344.1-344.*n*.

Figure 4:
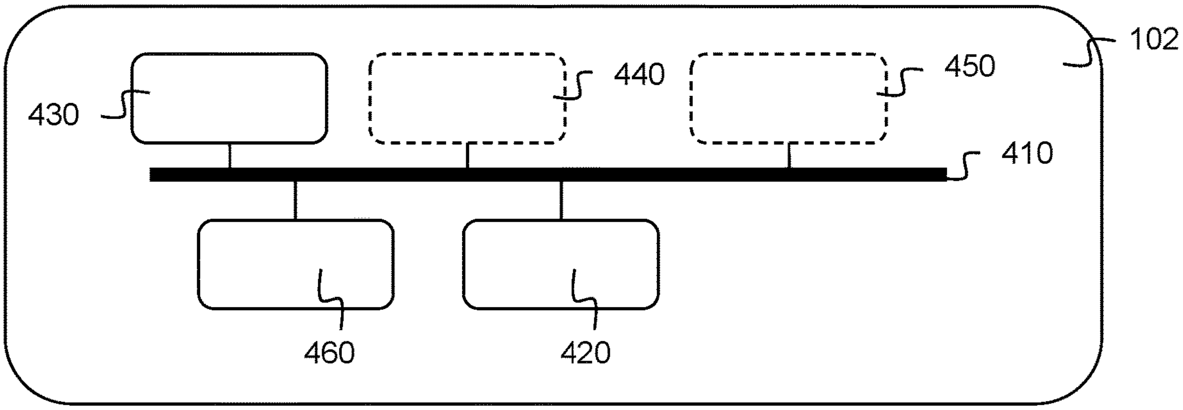
FIG. 4 schematically illustrates a host node of the multi-device storage system of FIG. 1.

FIG. 4 shows a schematic representation of an example host system 102. Host system 102 may comprise a bus 410, a processor 420, a local memory 430, one or more optional input units 440, one or more optional output units 450, and a communication interface 460. Bus 410 may include one or more conductors that permit communication among the components of host 102. Processor 420 may include any type of conventional processor or microprocessor that interprets and executes instructions. Local memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. For example, host driver 116 in FIG. 1 may be instantiated in instructions, operations, or firmware stored in local memory 430 for execution by processor 420. An optional input unit 440 may include one or more conventional mechanisms that permit an operator to input information to host 102 such as a keyboard, a mouse, a pen, voice recognition and/or biometric mechanisms, etc. Optional output unit 450 may include one or more conventional mechanisms that output information to the operator, such as a display, a printer, a speaker, etc. Communication interface 460 may include any transceiver-like mechanism that enables host 102 to communicate with other devices and/or systems. In some embodiments, communication interface 460 may include one or more peripheral interfaces, such as a PCIe interface for connecting to storage devices 120. In some embodiments, processor device 150 may be structures similarly to host system 102 in terms of basic component structure, but with a GPU replacing processor 420.

Figure 5:
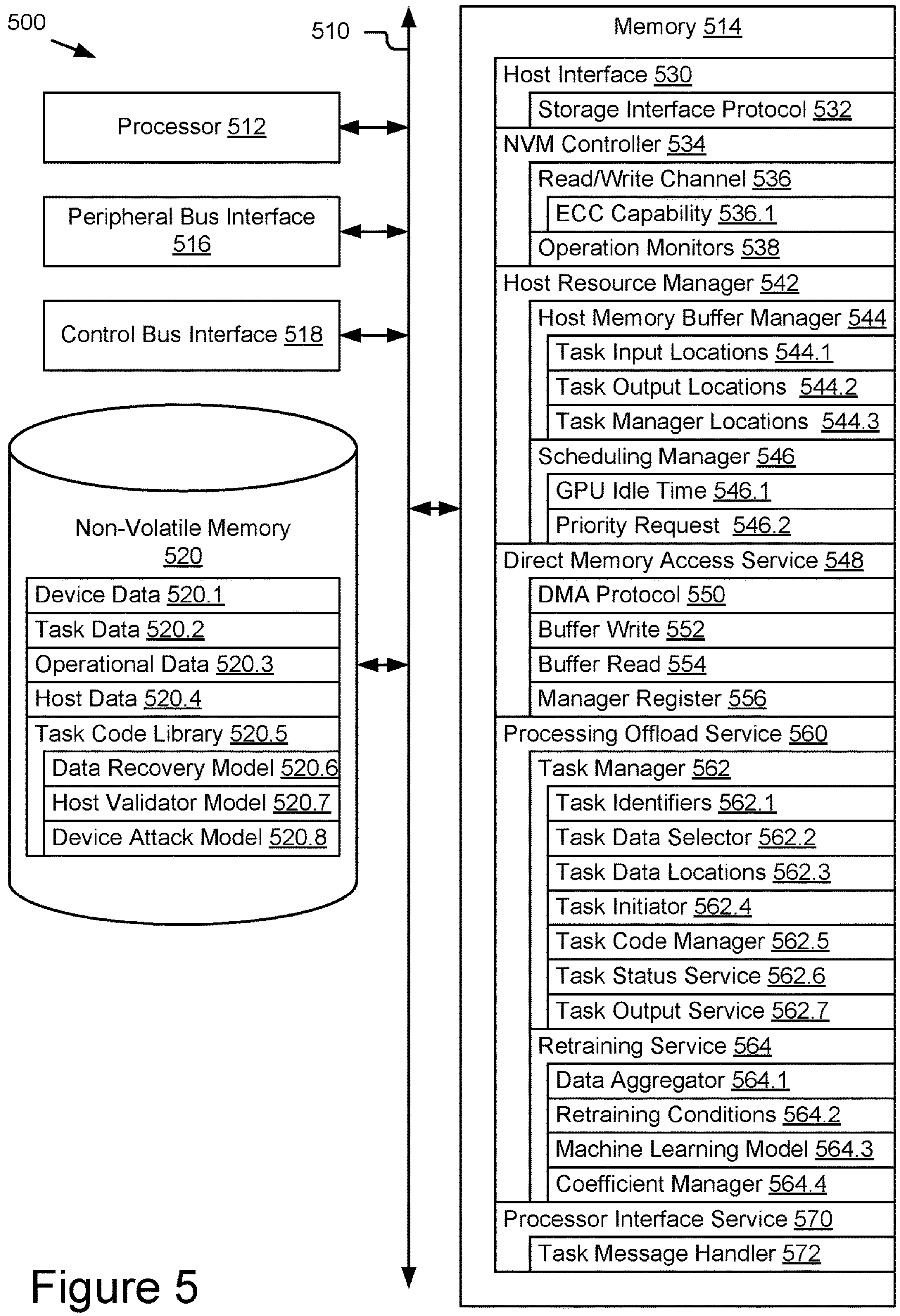
FIG. 5 schematically illustrates some elements of the storage devices of FIG. 1-3 in more detail.

FIG. 5 schematically shows selected modules of a storage device 500 configured for offloading processing tasks, such as storage devices 120. Storage device 500 may incorporate elements and configurations similar to those shown in FIGS. 1-3. For example, storage device 500 may be configured as a storage device 120 in communication with a host system and a processor device including a GPU over a peripheral bus.

Storage device 500 may include a bus 510 interconnecting at least one processor 512, at least one memory 514, and at least one interface, such as peripheral bus interface 516 and control bus interface 518. Bus 510 may include one or more conductors that permit communication among the components of storage device 500. Processor 512 may include any type of processor or microprocessor that interprets and executes instructions or operations. Memory 514 may include a random access memory (RAM) or another type of dynamic storage device that stores information and instructions for execution by processor 512 and/or a read only memory (ROM) or another type of static storage device that stores static information and instructions for use by processor 512 and/or any suitable storage element such as a hard disk or a solid state storage element.

Peripheral bus interface 516 may include a physical interface for connecting to a host using an interface protocol that supports storage device access. For example, peripheral bus interface 516 may include a PCIe, SATA, SAS, or similar storage interface connector supporting NVMe access to solid state media comprising non-volatile memory devices 520. Control bus interface 518 may include a physical interface for connecting to a control bus using a low-bandwidth interface protocol for low-level control messaging among computing components. For example, control bus interface 518 may include a I2C, I3C, SMBus, or similar bus interface connector supporting component-to-component messaging, such as multi-master, packet-based messaging over a two-wire bus.

Storage device 500 may include one or more non-volatile memory devices 520 configured to store host data. For example, non-volatile memory devices 520 may include a plurality of flash memory packages organized as an addressable memory array. In some embodiments, non-volatile memory devices 520 may include NAND or NOR flash memory devices comprised of single level cells (SLC), multiple level cell (MLC), or triple-level cells.

Storage device 500 may include a plurality of modules or subsystems that are stored and/or instantiated in memory 514 for execution by processor 512 as instructions or operations. For example, memory 514 may include a host interface 530 configured to receive, process, and respond to host data requests or host commands from client or host systems. Memory 514 may include a non-volatile memory (NVM) controller 534 configured to manage read and write operations to non-volatile memory devices 520. Memory 514 may include a host resource manager 542 configured to manage host resources and/or shared resources allocated to storage device 500. Memory 514 may include a direct memory access service 548 configured to access host resources and/or other processor resources using the host memory buffer as an intermediary. Memory 514 may include a processing offload service 560 configured for offloading processing tasks based on internal operational data to a GPU processor. Memory 514 may include a processor interface service 570 configured to communicate directly with a processor device in configurations that use direct communication between storage device 500 and the processor device over the peripheral bus.

Host interface 530 may include an interface protocol and/or set of functions and parameters for receiving, parsing, responding to, and otherwise managing host data requests and other host commands from a host. For example, host interface 530 may include functions for receiving and processing host requests for reading, writing, modifying, or otherwise manipulating data blocks and their respective client or host data and/or metadata in accordance with host communication and storage protocols. Host interface 530 may also support administrative and/or device management commands from the host to storage device 500. In some embodiments, host interface 530 may enable direct memory access and/or access over NVMe protocols through peripheral bus interface 516 to host data units 520.4 stored in non-volatile memory devices 520. For example, host interface 530 may include host communication protocols compatible with PCIe, SATA, SAS, and/or another bus interface that supports use of NVMe and/or RDMA protocols for data access to host data 520.4 from non-volatile memory 520. Host interface 530 may further include host communication protocols compatible with accessing host resources from storage device 500, such host memory buffers, host CPU cores, and/or specialized assistance for computational tasks.

In some embodiments, host interface 530 may include a plurality of hardware and/or software modules configured to use processor 512 and memory 514 to handle or manage defined operations of host interface 530. For example, host interface 530 may include a storage interface protocol 532 configured to comply with the physical, transport, and storage application protocols supported by the host for communication over peripheral bus interface 516. For example, storage interface protocol 532 may include both PCIe and NVMe compliant communication, command, and syntax functions, procedures, and data structures. In some embodiments, host interface 530 may include additional modules (not shown) for command handling, buffer management, storage device management and reporting, and other host-side functions. In some embodiments, at least some functions of operations monitor 538 may be directed to host-side functions and may be included in or interact with host interface 530.

NVM controller 534 may include an interface protocol and/or set of functions and parameters for reading, writing, and deleting data units in non-volatile memory devices 520. For example, NVM controller 534 may include functions for executing host data operations related to host storage commands received through host interface 530. For example, PUT or write commands may be configured to write host data units to non-volatile memory devices 520. GET or read commands may be configured to read data from non-volatile memory devices 520. DELETE commands may be configured to delete data from non-volatile memory devices 520, or at least mark a data location for deletion until a future garbage collection or similar operation actually deletes the data or reallocates the physical storage location to another purpose. In some embodiments, NVM controller 534 may include flash translation layer (FTL) management, data state machine, read/write buffer management, NVM device interface protocols, NVM device configuration/management/maintenance, and other device-side functions.

In some embodiments, NVM controller 534 may be configured to allocate a portion of the memory locations in non-volatile memory devices 520 for storing data other than host data 520.4. For example, NVM controller 534 may allocate device data 520.1 as memory locations reserved for internal device data, including device configuration, parameter, and internal operation data. In some embodiments, NVM controller 534 may allocate task data 520.2 as memory locations reserved for aggregating internal device data (e.g., selected/aggregated operational data 520.3) related to a processing task to be offloaded to the processor of another device, such as the GPU of the processor device. In some embodiments, NVM controller 534 may allocate operational data 520.3 related to internal operations of storage device 500, such as log data, error data, trace data, performance data, etc. Operational data 520.3 may expressly exclude host data 520.4 received or returned based on host storage commands, such as host data read and write commands. In some embodiments, storage space allocated to device data 520.1, task data 520.2, and/or operational data 520.2 may be excluded from the storage capacity made available to host data 520.3, such as overprovisioned storage locations hidden from the host for use storing internal operation data, FTL tables, replacing bad blocks, etc.

NVM controller may include a read/write channel 536 controlling the flow of data to and from non-volatile memory 520. Read/write channel 536 may include one or more specialized circuits configured for processing binary data to be written to non-volatile storage media using an analog write signal and processing the analog read signal from the non-volatile storage medium back into binary data. For example, read/write channel 536 may include a write path comprised of various data scramblers, run-length limited (RLL) encoders, iterative error correction code (ECC) encoders, precompensation circuits, and other data or signal processing components. Read/write channel 536 may include a read path comprised of various amplifiers, filters, equalizers, analog-to-digital converters (ADCs), soft information detectors, iterative ECC decoders, and other data or signal processing components. The write channel components may comprise a write channel circuit and the read channel components may comprise a read channel circuit, though the circuits may share some components. Read/write channel 536 may provide the analog write signal to and receive the analog read signal from non-volatile memory 520.

In some configurations, read/write channel 536 may include an ECC processor configured to receive read data for a host data block and use iterative ECC processing to decode the received read data into decoded data for further processing by NVM controller 534 and/or communication to the host by host interface 530. For example, an ECC processor may include one or more soft output Viterbi algorithm (SOVA) detectors and low density parity check (LDPC) decoders operating on multi-bit encoded symbols to decode each sector of data received by read/write channel 536. Iterative decoding of codewords may be based on soft information, such as log-likelihood ratios (LLR), generated from SOVA detectors and/or LDPC decoders. In some configurations, the ECC processor may support one or more code rates with a defined ECC capability 536.1. For example, ECC capability 536.1 may be quantified based on a number of bit errors in a codeword that can be corrected by the ECC processor. Codewords read from non-volatile memory 520 with a number of bit errors in excess of ECC capability 536.1 may generate unrecoverable ECC (UECC) errors and may trigger heroic data recovery processes, such as re-reads with different read signal settings or use of stored parity values for a group of codewords. For example, a set of codewords may be configured according to a redundant array of independent disks (RAID) configuration with one or more data subunits including parity calculated from the set of codewords based on exclusive-or (XOR) processing. However, using XOR processing across a set of data units to recover from one or more unrecoverable errors may require substantial processing power and, ideally, parallel processing capabilities to correct the errors in a reasonable amount of time for the pending read operation(s). In some embodiments, XOR-based data recovery for UECC errors beyond ECC capability 536.1 may be offloaded to a processing device with a GPU, as described elsewhere.

In some embodiments, NVM controller 534 may include one or more operation monitors 538. For example, NVM controller 534 may include a number of state machines configured to monitor various aggregate operating parameters of storage device 500. In some embodiments, each operation monitor may target a set of operation data generated from the internal operations of storage device 500 for tracking one or more operational data values against one or more thresholds for triggering state changes that modify the internal operations of storage device 500. For example, each operation monitor 538 may use an operating model to model a normalized set of operational data and determine when run-time operational data (including historical aggregation and/or derived values from run-time operational data) departs from acceptable operating ranges (or crosses a corresponding threshold value) to trigger a state change. For example, storage device 500 may include one or more temperature sensors that monitor temperature within one or more components of the storage device and determine when one or more run-time temperature values exceed an operating threshold to trigger a state change, such as to an operation throttling state that reduces the rate of host commands that can be processed.

Some operation monitors 538 may be based on a machine learning algorithm trained from prior operational data sets. For example, the operating models of operation monitors 538 may be based on a node structure, such as a multilayer artificial neural network structure, that uses node coefficient values to control the processing of operational data to determine an operating value for comparison to an operating threshold. While the calculation of a current operating value based on a previously trained operating model may be within the normal processing capabilities of processor 512, the training process to determine the node coefficients may exceed the run-time capabilities of storage device 500, particularly when balanced with the ongoing processing requirements of host storage operations and background maintenance operations. In some embodiments, retraining of operating models to generate updated node coefficients may be offloaded to a processing device with a GPU, as described elsewhere.

Host resource manager 542 may include interface protocols and a set of functions and parameters for using host resources to complete operations for storage device 500. For example, host resource manager 542 may be configured to identify and manage host resources that the host makes available for direct access and use by storage device 500, such as host memory buffers. Host resource manager 542 may include a plurality of hardware and/or software modules configured to use processor 512, memory 514, and host interface 530 for communication with host resources. For example, host resource manager 542 may include a host memory buffer manager 544 configured to manage a host memory buffer space in the host system that is allocated to storage device 500. In some embodiments, a set of memory locations in a host memory device may be allocated for use by storage device 500 for host storage transfer, address management, and other functions supporting host use of the data storage and retrieval capabilities of storage device 500. In some embodiments, host memory buffer manager 544 may allocate specific storage locations in the host buffer memory to offloading processing tasks. For example, host memory buffer manager 544 may allocate a set of task input locations 544.1 for putting task input data to the host memory buffer, task output locations 544.2 for getting task output data from the host memory buffer, and task manager locations 544.3 for accessing and/or updating shared data resources for coordinating offloaded processing tasks with the host and/or processor system. For example, task manager locations 544.3 may include storage locations for a task identifier lookup table, a status register, and/or a messaging register.

In some embodiments, host resource manager 542 may include a scheduling manager 546 for interfacing with the host to schedule access to host and/or shared resources. For example, scheduling manager 546 may enable storage device 500 and the host to coordinate use of a shared processor device including a GPU. In some embodiments, the host may manage access to the shared processor device and may notify storage device 500 regarding the availability of the shared processor device for executing an offloaded processing task. For example, scheduling manager 546 may receive notifications through the host memory buffer, such as in status or messaging registers, or may receive a host administrative message through host interface 530 for notification of processor availability. In some embodiments, scheduling manager 546 may receive notifications of GPU idle time 546.1. For example, the host may notify scheduling manager 546 when the host (and/or other devices) are not using the processor device and storage device 500 may offload processing tasks to it. In some embodiments, scheduling manager 546 may initiate priority requests to the host for access to the processor device. For example, scheduling manager 546 may determine a priority indicator for each processing and may communicate the priority to the host to enable scheduling of task offload. In some embodiments, the host may use the priority indicators for offload processing tasks from storage device 500 to coordinate with its own offload processing tasks and/or those of other hosts, storage devices, or other devices. For example, scheduling manager 546 may set priority and/or status indicators in a status register and/or send a scheduling message to the host and may receive a response in the status register or a response message indicating a processing window in which processing offload service 560 may initiate the processing task by the processor device.

In some embodiments, host resource manager 542 may be configured to use host resources in accordance with the memory and processing needs of other storage device operations, such as the operations of NVM controller 534. For example, host memory buffer manager 544 may manage the allocation of host memory buffer space to cache recently or frequently used host data, host mapping data, and/or related FTL data. In some embodiments, host resource manager 542 may include or interface with direct memory access service 548 for accessing host resources. In some embodiments, host resource manager 542 may include or interface with processing offload service 560 for storing and accessing offloaded processing task data.

Direct memory access service 548 may include interface protocols and a set of functions and parameters for accessing direct memory resources through host interface 530 to support host resource manager 542. For example, direct memory access service 548 may use host access parameters to populate messages and/or access or session requests in accordance with storage interface protocol 532 to access host resources. In some embodiments, direct memory access service 548 may use a DMA protocol 550, such as RDMA, to provide direct memory access to the host memory buffer. Direct memory access service 548 may include hardware and/or software modules configured to use processor 512, memory 514, and storage interface protocol 532 for establishing access to resources outside of storage device 500 through peripheral bus interface 516. In some embodiments, direct memory access service 548 may include a buffer write function 552 configured to store or put data from storage device 500 to target memory locations in the host memory buffer, such as task input locations 544.1 and/or task manager locations 544.3. In some embodiments, direct memory access service 548 may include a buffer read function 554 configured to read or get data from the host memory buffer, such as task output locations 544.2, to storage device 500. In some embodiments, direct memory access service 548 may include manager register functions 556 for communicating with other devices through one or more registers or other data structures in the host memory buffer, such as task manager locations 544.3. For example, task identifiers and related task parameters may be written to and read from a task identifier lookup table and/or status/priority indicators may be written to and read from task manager locations 544.3.

Processing offload service 560 may include an interface protocol and set of functions and parameters for offloading processing tasks based on internal data to a processor device with a GPU. For example, processing offload service 560 may support processing tasks, such additional error recovery, training of machine learning-based operating models, and other processing-intensive functions that would otherwise occupy processor 512 or other processing resources within storage device 500. In some embodiments, processing offload service 560 may operating in conjunction with host interface 530, host resource manager 542, and direct memory access service to use the host memory buffer of the host system as an intermediary for offloading processing tasks to the processor device. In some embodiments, processing offload service 560 may be invoked by NVM controller 534 to support internal operations, such as error recovery for read/write channel 536 and/or operation monitors 538. In some embodiments, processing offload service 560 may use processor interface service 570 for direct communication with the processor device that supplements data transfer through the host memory buffer.

In some embodiments, processing offload service 560 may include a plurality of hardware and/or software modules configured to use processor 512 and memory 514 to handle or manage defined operations of processing offload service 560. For example, processing offload service 560 may include a task manager 562 configured to manage the offloading of processing tasks to the processor device, including handling of output task data from the offloaded processing. For example, processing offload service 560 may include a retraining service 564 configured to use task manager 562 to handle periodic retraining of machine learning-based operating models for operation monitors 538.

Task manager 562 may include data structures, functions, and interfaces for managing processing tasks for offload to the processor device. For example, task manager 562 may be initiated by NVM controller 534 when a processing task is identified for offload and operational data is available for task input data. In some embodiments, task manager 562 may manage a plurality of offloaded tasks in any given operating period and may assign task identifiers 562.1 to each task for offload. For example, each instance of a processing task may receive a unique identifier value used by task manager 562 and other components of the storage system to manage the data and functions for completing that processing task.

Once a processing task is identified, task manager 562 may determine or select the operational data to be used as the task input data. In some embodiments, task manager 562 may include a task data sector 562.2 comprising logic for receiving and/or selecting internal operational data for a target processing task. For example, a processing task request from NVM controller 534 may include a set of operational data and/or identify a type and selection parameters for determining the set of operational data from operational data 520.3 and/or ongoing operations to buffer in task data 520.2. Task manager 562 may start a task offloading process by storing some or all of the task input data to the host memory buffer. For example, task manager 562 may use direct memory access service 548 to write the task input data to task input locations 544.1 in the host memory buffer. In some embodiments, host memory buffer manager 544 may select the specific buffer memory storage locations to which the task input data is written and return task data locations 562.3 to task manager 562. For example, host memory buffer manager 544 may allocate a set of host memory buffer storage locations to the processing task using the task identifier and provide storage location identifiers to task manager 562 and/or store them in a task identifier lookup table in the host memory buffer. In some embodiments, task manager 562 may aggregate task input data over multiple time points of an operating period by selecting operational data from ongoing operations and storing it in task data 520.2 and/or storing it to task input data locations for the task identifier in the host memory buffer.

Once the set of task input data is stored in the host memory buffer, task manager 562 may initiate the processing of the processing task by the processor device. In some embodiments, task manager 562 may include a task initiator 562.4 configured to initiate a processing task. For example, task initiator 562.4 may send a task initiator message to the host memory buffer, host system, and/or directly to the processor device indicating the storage location of the task input data, the task code for processing the task, and/or the task output locations for the task output data. In some embodiments, task initiator 562.4 may use scheduling manager 546 to determine whether and when the processor device is available for processing a task. For example, task manager 562 may determine one or more processing tasks that are ready for processing and use scheduling manager 546 to determine when an initiator message should be sent. In some embodiments, task initiator 562.4 may send a task ready status notification to the host system or host memory buffer and the host system and/or processor device may determine when to initiate the processing task based on a task queue and/or priority of the task. For example, task initiator 562.4 may write a task ready status and priority indicator to a status register in the host memory buffer for use by the host system and/or processor device.

Task manager 562 may determine or select task code to be used for processing the input data set. For example, task code may be selected from task code library 520.5 and included in the task initiator message and/or stored as a task code set in the host memory buffer. In some embodiments, task manager 562 may include a task code manager 562.5 configured to manage sets of task code for one or more processing task types. For example, processing task types may correspond to the different computational models used for respective processing tasks and task code library 520.5 may include sets of software code for each processing task type configured for parallel computation by a GPU. In some embodiments, task code library 520.5 may include a data recovery model 520.6. For example, data recovery model 520.6 may include a set of GPU instructions configured for parallel processing of XOR operations across subsets of read data including at least one UECC and a corresponding subset of parity data. In some embodiments, task code library 520.5 may include a host command validator model 520.7. For example, host command validator model 520.7 may include a set of GPU instructions for training the host command validator model used by operations monitor 538 for monitoring patterns of host commands received by host interface 530 to determine when host commands should be rejected. In a first operating state, valid commands meet a model threshold and are processed as normal. In a second operating state triggered by host commands not meeting the model threshold, invalid commands are rejected and notification of the rejected commands is sent to the host. In some embodiments, task code library 520.5 may include a device under attack model 520.8. For example, device under attack model 520.8 may include a set of GPU instructions for training the device under attack model used by operations monitor 538 for monitoring patters of host commands received by host interface 530 to determine suspicious activity and trigger a security response, such as entering a read-only mode and sending a notification to the host or another component. In some embodiments, sets of GPU instructions may be sent by task initiator 562.4 as task code sets to the host memory buffer and/or included in the task initiator message to the processor device.

In some embodiments, task manager 562 may include a task status service 562.6 configured to update and/or monitor status indicators for processing tasks. For example, task status service 562.6 may update a status register in the host memory buffer when processing task is ready, initiated, or pending and then monitor the status register to determine when the processing task is complete (or returns an error or other status indicator). In some embodiments, task status service 562.6 may access and/or store status indicators to a status register in the host memory buffer. In some embodiments, task status service 562.6 may manage a status indicator in task manager 562 and use messaging (including response handling) to monitor and update task status. Task status service 562.6 may determine when a processing task is complete based on shared status indicators and/or completion notification messages. Upon completion of a processing task, task manager 562 may access or retrieve the task output data from the host memory buffer and/or otherwise receive the task output data from the processor device. In some embodiments, task manager 562 may include a task output service 562.7 configured to determine the task output data and use it to initiate a corresponding internal operational process. For example, task output service 562.7 may access the task output data from the host memory buffer and use it to update read/write channel 536 with the additional data decoding information from the data recovery model or update the node coefficients of the operating models used by operation monitors 538. Task output service 562.7 may use a buffer read operation through direct memory access service 548 to read the task output data from task output locations corresponding to the task identifier and return the task output data to NVM controller 534 to support internal operations of storage device 500.

In some embodiments, retraining service 564 may include data structures, functions, and interfaces for offloading training of operating model coefficients throughout the operating life of storage device 500. For example, retraining service 564 may use task manager 562 and/or be configured as a specific instance of task manager 562 configured for periodic machine learning training tasks. Retraining service 564 may aggregate operational data into a training data set for a machine learning training operation. In some embodiments, retraining service 564 may include a data aggregator 564.1 configured to aggregate the training data set over an operating period comprised of multiple time points. For example, data aggregator 564.1 may be configured with a target operational data type and a set of selection parameters for selecting operational data values to be added to the training data set. The resulting training data set may then be used as the input task data for the machine learning training processing task. Retraining service 564 may be configured to execute periodically throughout the operating life of storage device 500. In some embodiments, retraining service 564 may include retraining conditions 564.2 to determine whether and when a particular operational model should be retrained. For example, retraining conditions 564.2 may be based on a retraining interval, such as a period of time, number of operations, number of operation errors, etc., between each training process and/or a set of logical conditions, such as an error threshold being met, a predefined state change, an operating parameter variance threshold, etc. In some embodiments, retraining conditions 564.2 may include receipt of a retraining command from the host system.

Retraining service 564 may use task manager 562 to assign a task identifier to the training processing task and select the training data set from data aggregator 564.1 as the input task data. Task code manager 562.3 may select a machine learning model 564.3 from task code library 520.5 and task initiator 562.4 may initiate the training processing task using the task code for machine learning model 564.3. For example, machine learning mode 564.3 may include a machine learning algorithm, a learning constant, and a cost function for determining node coefficient values for an operating model based on the training data set. Retraining service 564.4 may receive the task output data from task output service 562.7 and use it to update the corresponding operating model in operation monitors 538. In some embodiments, retraining service 564 may include a coefficient manager 564.4 configured to receive task output data comprised of a set of updated node coefficient values and use those values to replace prior node coefficient values in the corresponding operating mode. For example, coefficient manager 564.4 may update a set of node coefficient parameters in a parameter table for the operating model based on the node coefficient values returned in the output task data set.

Processor interface service 570 may include interface protocols and a set of functions and parameters for using direct communication with the processor device through the peripheral bus. For example, the processor device may support storage interface protocol 532 to enable messaging over the peripheral bus in addition to storing data to and accessing data from host memory buffer locations accessible to both the processor device and storage device 500. In some embodiments, processor interface service 570 may include a messaging service similar to the messaging service used for host commands and responses through host interface 530. For example, processor interface service 570 may include a task message handler 572 that uses messaging protocols for sending and receiving messages over the peripheral bus between the processor device and storage device 500. In some embodiments, task message handler 572 may use PCIe compliant addressing to send and receive messages with data payloads for communicating regarding pending and/or complete processing tasks. For example, task message handler 572 may support task initiator 562.4 sending task initiator messages to the processor device and/or task status service 562.6 receiving task complete messages from the processor device.

Figure 6:
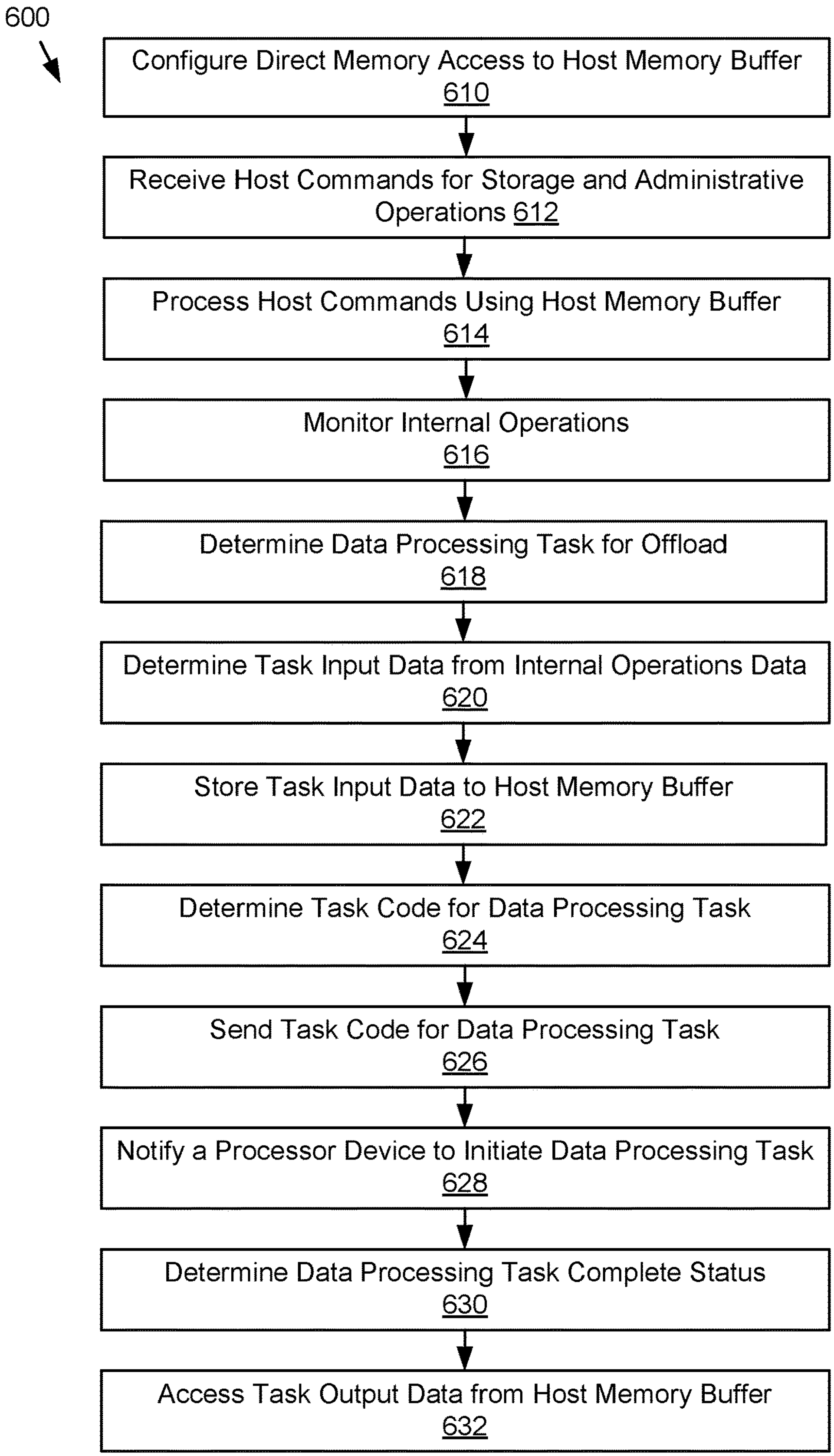
FIG. 6 is a flowchart of an example method of offloading processing tasks from a data storage device.

As shown in FIG. 6, storage device 500 may be operated according to an example method for offloading processing tasks from a data storage device, i.e., according to method 600 illustrated by blocks 610-632 in FIG. 6.

In block 610, direct memory access to a host memory buffer may be configured. For example, a host resource manager may use a direct memory access service to determine a set of storage locations in a host memory buffer allocated for use by the data storage device.

In block 612, host commands for storage and administrative operations may be received. For example, a host interface may receive host commands from the host system that include host storage operations and storage device management operations.

At block 614, host commands may be processed using the host memory buffer. For example, the data storage device may use the host memory buffer for maintaining lookup tables, buffering frequently accessed data, and/or coordinating host data exchange to or from the data storage device.

At block 616, internal operations may be monitored. For example, a number of operation monitors in the data storage device may monitor various internal operating parameters based on corresponding operating models for determining data storage device states and state changes.

At block 618, a data processing task may be determined for offload. For example, an NVM controller may determine a processing task corresponding to a large volume of parallel computations that could be better handled by a GPU.

At block 620, task input data may be determined from internal operations data. For example, a task manager may select a set of operational data for input into the data processing task.

At block 622, task input data may be stored to the host memory buffer. For example, the task manager may use direct memory access to put the task input data in a storage location allocated for transferring task data.

At block 624, task code may be determined for the data processing task. For example, the task manager may select a task code set from a task code library configured for parallel processing by a GPU.

At block 626, task code for the data processing task may be sent. For example, the task manager may store the task code to the host memory buffer and/or send the task code with a notification to the processor device in block 628.

At block 628, the processor device may be notified to initiate the data processing task. For example, the task manager may send a task initiation message to the processor device, host system, or status register of the host memory buffer.

At block 630, a data processing complete status may be determined. For example, the task manager may determine a task complete status from a task complete message or checking the status register in the host memory buffer.

At block 632, task output data for the processing task may be accessed from the host memory buffer. For example, the task manager may use direct memory access to retrieve the task output data from the host memory buffer and use it in internal operations of the data storage device.

Figure 7:
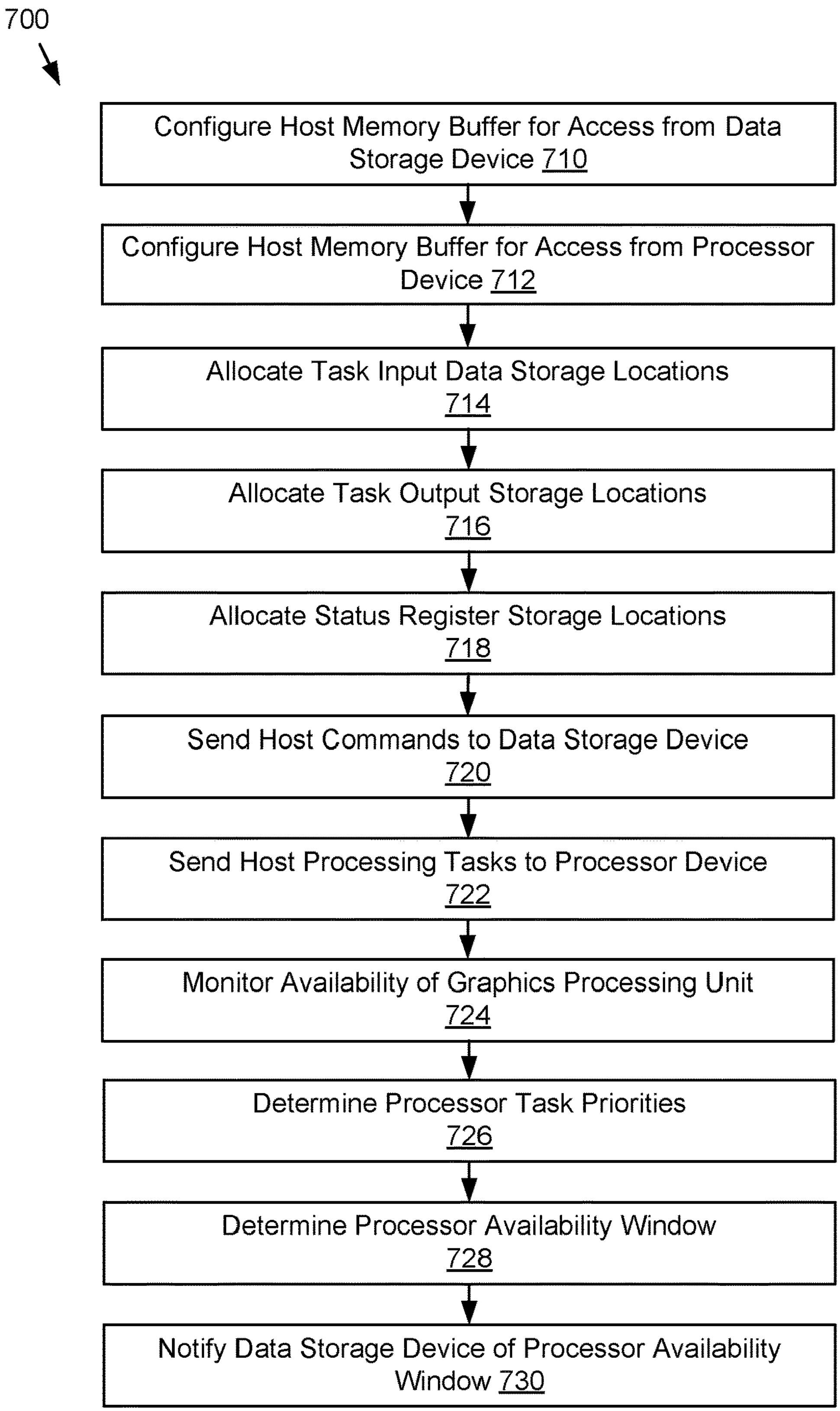
FIG. 7 is a flowchart of an example method of intermediating between a data storage device and a processor device by a host system.

As shown in FIG. 7, host system 102 may be operated according to an example method for intermediating between a data storage device and a processor device, i.e., according to method 700 illustrated by blocks 710-730 in FIG. 7.

At block 710, a host memory buffer may be configured for access from a data storage device. For example, the host system may allocate a set of storage locations in a host memory device for access by the data storage device using direct memory access.

At block 712, the host memory buffer may be configured for access from a processor device. For example, the host system may allocation an overlapping set of storage locations in the host memory device for access by the processor device using direct memory access, where both the data storage device and the processor device can access a common set of storage locations.

At block 714, task input data storage locations may be allocated. For example, the host system may allocate a portion of the common set of storage locations for the transfer of task input data.

At block 716, task output data storage locations may be allocated. For example, the host system may allocate another portion of the common set of storage location for the transfer of task output data.

At block 718, status register storage locations may be allocated. For example, the host system may allocate another portion of the common set of storage locations for transfer of status indicators and/or other task management data.

At block 720, host commands may be sent to the data storage device. For example, the host system may send host commands for host storage operations and storage device management operations to the data storage device for execution by the data storage device using its non-volatile storage media.

At block 722, host processing tasks may be sent to the processor device. For example, the host system may send processing tasks for parallel computation using a GPU to the processor device, rather than using the host processor.

At block 724, availability of the graphics processor unit may be monitored. For example, the host system may receive availability indicators from the processor device for the GPU and/or use a processing task queue and/or processing task response metrics to determine the workload and/or idle time of the GPU.

At block 726, processor task priorities may be determined. For example, the host system may include a scheduling service with logic for determining priority among host processing tasks and offload processing tasks from one or more data storage devices.

At block 728, a processor availability window may be determined. For example, the scheduling service may include logic for determining when the GPU is available for processing and calculate a corresponding processor availability window.

At block 730, a data storage device may be notified of the processor availability window. For example, the host system may send a host availability notification message indicating the processor availability window and/or use a status indicator in the status register for one or more offload processing tasks to indicate processor availability windows for those offload processing tasks.

Figure 8:
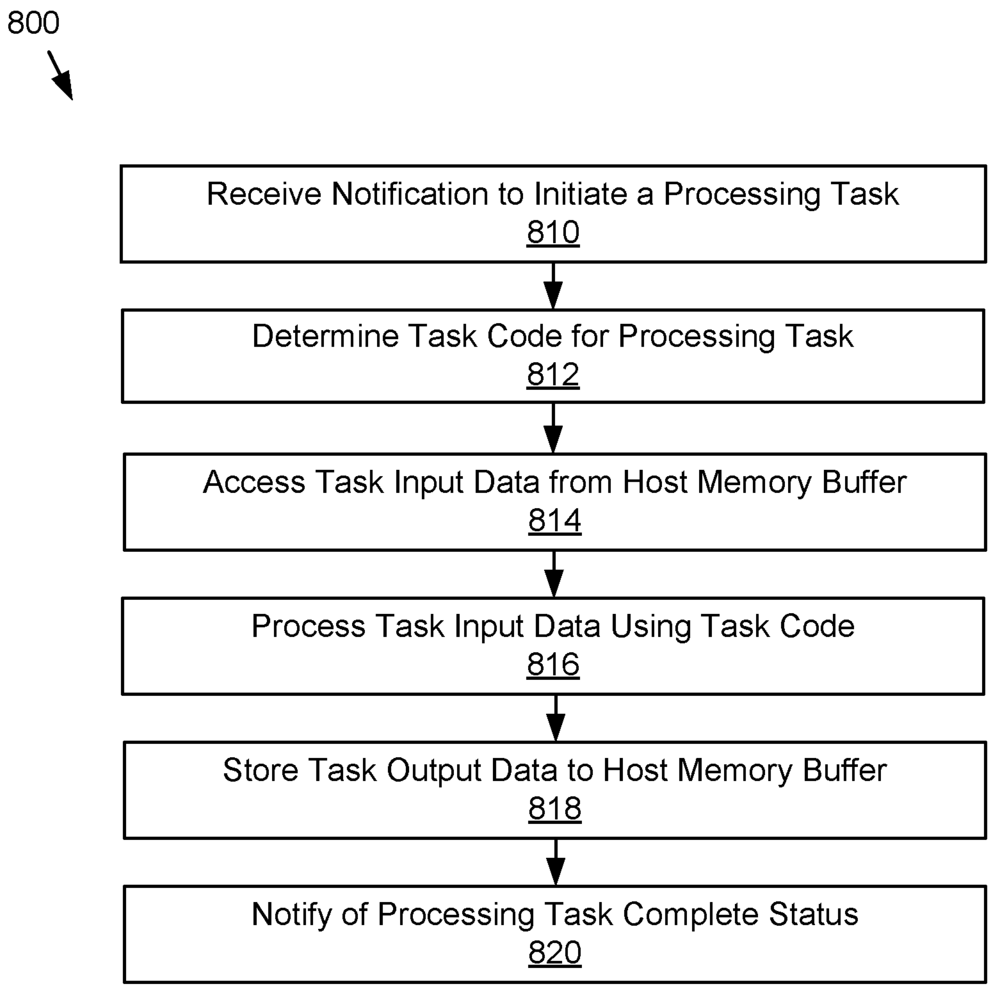
FIG. 8 is a flowchart of an example method of processing offloaded processing tasks by a processor device.

As shown in FIG. 8, processor device 150 may be operated according to an example method for processing offloaded processing tasks, i.e., according to method 800 illustrated by blocks 810-820 in FIG. 8.

At block 810, a notification may be received to initiate a processing task. For example, the processor device may receive a task initiation message from a data storage device or a host system, directly or using a status indicator in a status register checked periodically by the processor device.

At block 812, task code may be determined for the processing task. For example, the processor device may receive the task code in the task initiation message and/or access the task code from a shared storage location in a host memory buffer using direct memory access.

At block 814, task input data may be accessed from the host memory buffer. For example, the processor device may access the task input data from a shared storage location in the host memory buffer using direct memory access.

At block 816, the task input data may be processed using the task code. For example, the processor device may use the task code to divide the task input data into a set of parallel computations for its GPU.

At block 818, task output data may be stored to the host memory buffer. For example, the processor device may store the task output data from processing the task input data to the shared storage location in the host memory buffer using direct memory access.

At block 820, the data storage device may be notified of task complete status for the processing task. For example, the processor device may send a task complete message to the data storage device and/or host system and/or write a task complete status indicator to a status register in the host memory buffer.

Figure 9:
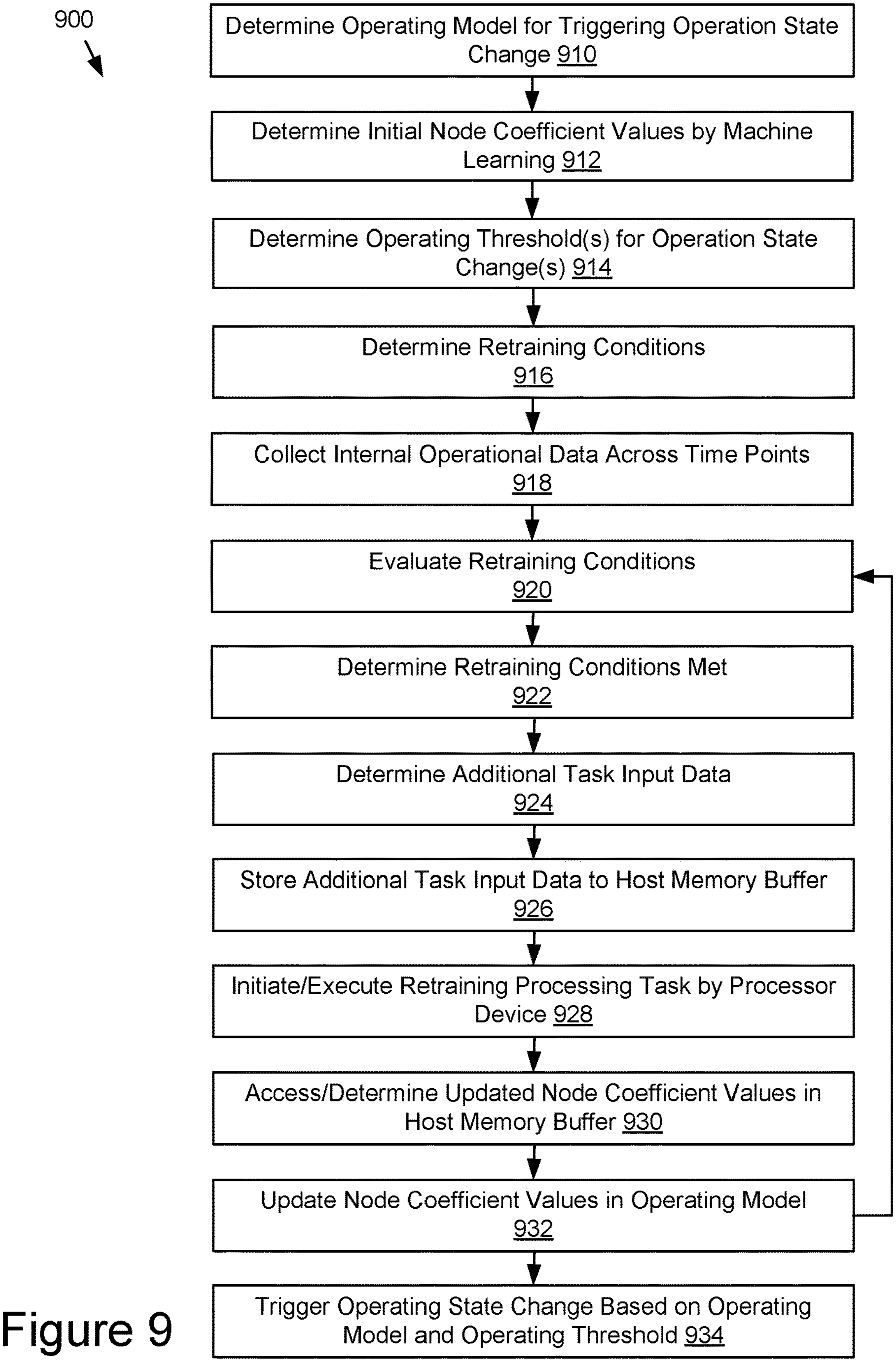
FIG. 9 is a flowchart of an example method of offloading processing of machine learning training from a data storage device.

As shown in FIG. 9, storage device 500 may be operated according to an example method for offloading processing of machine learning training, i.e., according to method 900 illustrated by blocks 910-934 in FIG. 9.

At block 910, an operating model for triggering operation state changes may be determined. For example, the data storage device may include a number of operation monitors collecting operational data related to various internal operations and using an operating model to determine when a change of operating state should be triggered for the storage device.

At block 912, initial node coefficient values may be determined by machine learning. For example, the data storage device may initially be trained during manufacturing and/or initialization based on a training data set and machine learning algorithm for determining the initial set of node coefficient values for the operating model.

At block 914, operating thresholds may be determined for operation state changes. For example, the data storage device may be configured with threshold values corresponding to various operating boundaries between operational states, such threshold values derived from the normal operating ranges of a set of related operating parameters processed by the operating model.

At block 916, retraining conditions may be determined. For example, a retraining service may include one or more retraining conditions for each operating model to determine whether and when that operating model should be retrained based on an updated set of training data from run-time operations of the data storage device.

At block 918, internal operational data may be collected across time points. For example, during an operating period since a prior training process, the retraining service may collect operational data for retraining the operating model and aggregate it in a retraining data set.

At block 920, retraining conditions may be evaluated. For example, the retraining service may monitor one or more parameters related to the retraining conditions determined at block 916 and evaluate them against the corresponding retraining conditions.

At block 922, that at least one retraining condition is met may be determined. For example, the retraining service may determine from the evaluation at block 920 that a retraining condition is met, such as an elapsed time or number of operations since the prior training process.

At block 924, additional task input data my be determined. For example, the retraining service may use the retraining data collected at block 918 to provide additional task input data for a retraining process, such as using the collected retraining data alone for the task input data or adding the new retraining data to the prior set of training data for a cumulative retraining data set.

At block 926, the additional task input data may be stored to the host memory buffer. For example, a task manager may store the additional task input data for the retraining task to the host memory buffer.

At block 928, the retraining processing task by the processor device may be initiated for execution. For example, the task manager may send a task initiation message to initiate the processor device to execute the retraining processing task using the retraining data set.

At block 930, updated node coefficient values may be determined from accessing the host memory buffer. For example, the task manager may access and get the updated node coefficient values from the task output data for the retraining processing task.

At block 932, node coefficient values may be updated in the operating model. For example, the retraining service may update the node coefficient values for the operating model in a parameter page for the operating model. Method 900 may return to block 920 to continue evaluating retraining conditions for a next retraining process for the operating model to enable periodic retraining, where each of blocks 922-932 may be completed periodically each time the retraining conditions are met.

At block 934, operating state changes may be triggered based on the operating model and operating threshold. For example, the operating model may evaluate a set of parameters from the operational data to generate a model output value, such as a likelihood value that a state change should be triggered, and the operating threshold may include a likelihood threshold value (e.g., 50%, 80%, 95%, etc.) for triggering the state change.

Figure 10:
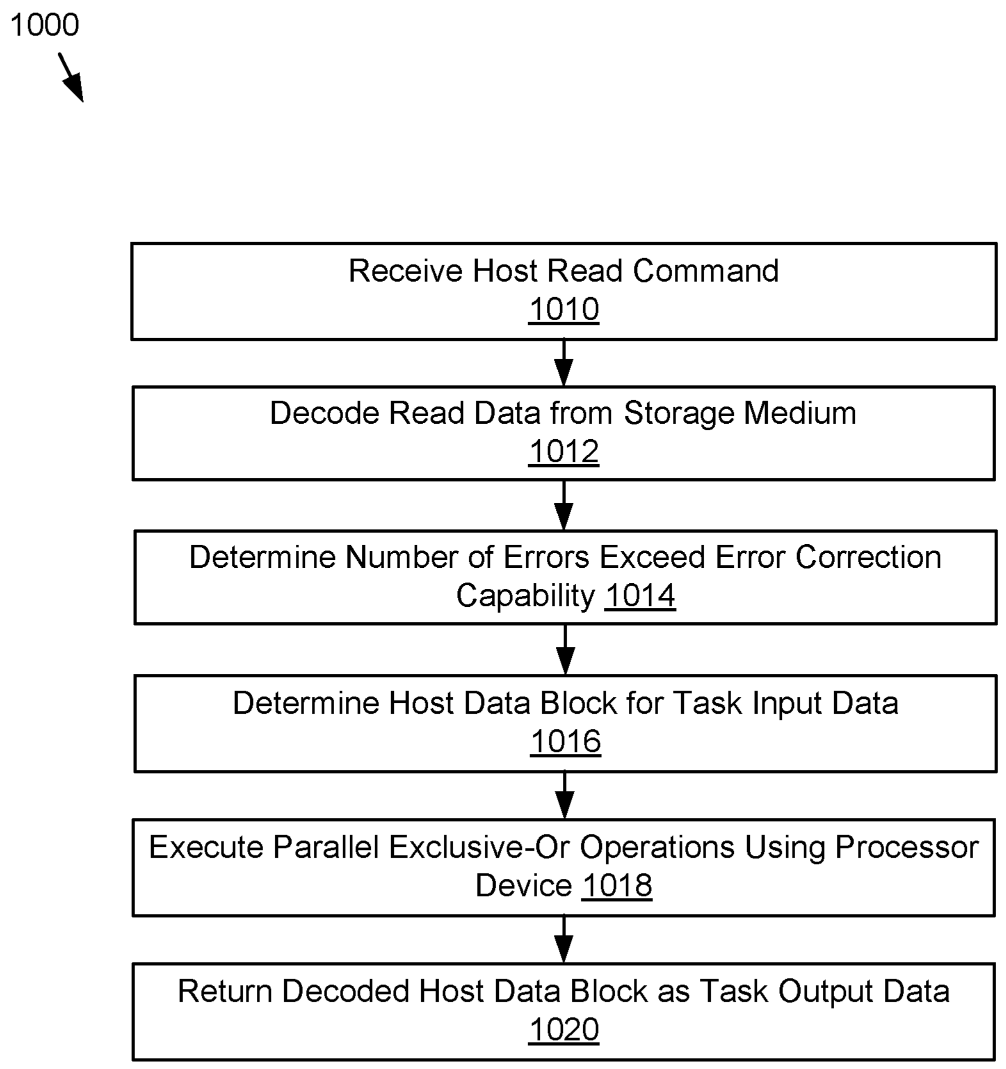
FIG. 10 is a flowchart of an example method of offloading an error recovery processing task.

As shown in FIG. 10, storage device 500 may be operated according to an example method for offloading an error recovery processing task, i.e., according to method 1000 illustrated by blocks 1010-1020 in FIG. 10.

At block 1010, a host read command may be received. For example, the data storage device may receive one or more host read commands targeting a host data block stored in the non-volatile storage medium of the data storage device.

At block 1012, read data from the storage medium may be decoded. For example, the read channel may retrieve the read data corresponding to the host data block from the storage medium and attempt to decode the read data using the error recovery capability of the ECC processor in the read channel.

At block 1014, a number of errors exceeding the error correction capability may be determined. For example, the read channel may return a number of UECC errors that represent read errors that exceeded the error correction capability of the ECC processor.

At block 1016, the host data block may be determined as the task input data. For example, the read data corresponding to the host data block and/or partially decoded host data for the host data block, including parity data corresponding to the host data block, may be selected as the task input data.

At block 1018, parallel exclusive-or operations may be executed using the processor device. For example, the data storage device may initiate task code for a data recovery model based on parallel processing of the host data block subunits and parity data to provide additional information for decoding the host data unit.

At block 1020, the decoded host data block may be returned as task output data. For example, the processor device may return the decoded host data block to the data storage device through the host memory buffer and the data storage device may return the decoded host data block as part of the response to the host read command.

Figure 11:
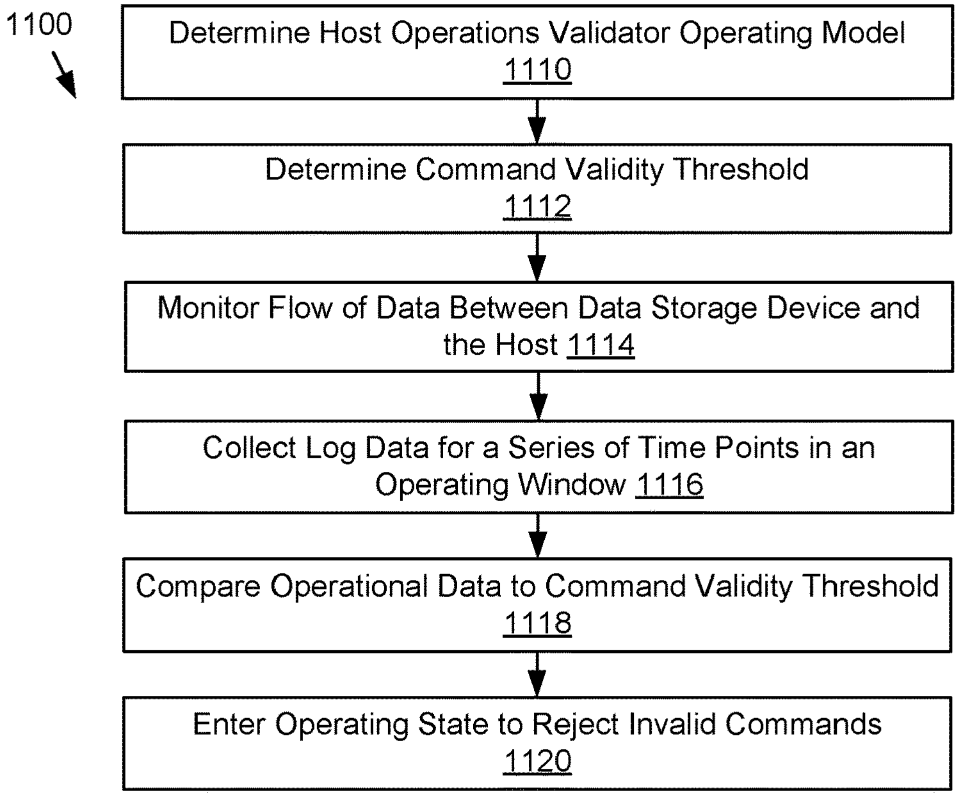
FIG. 11 is a flowchart of an example method of offloading a host operations validation model training processing task.

As shown in FIG. 11, storage device 500 may be operated according to an example method for offloading a host operations validation model training processing task, i.e., according to method 1100 illustrated by blocks 1110-1120 in FIG. 11.

At block 1110, a host operations validator operating model may be determined. For example, the data storage device may include an operation monitor including an operations validator operating model based on a network of node coefficients trained by machine learning.

At block 1112, a command validity threshold may be determined. For example, the host operations validator operating model may generate a confidence value as an operating model output value and the command validity threshold may include a confidence threshold value for triggering a change in a command validity state.

At block 1114, flow of data between the data storage device and the host may be monitored. For example, the operation monitor may monitor host commands and access to the host memory buffer to generate operational data from the host interface and store it as log data.

At block 1116, log data may be collected for a series of time points in an operating window. For example, a task manager may select log data for the flow of data from an operating window for training or retraining the host operations validator operating model. Training and/or retraining may be executed according to method 900 of FIG. 9.

At block 1118, operational data may be compared to the command validity threshold using the operating model. For example, the operational data collected by the operations monitor may be processed using the operating model and the node coefficients determined by the training process of method 900 to generate a run-time confidence value for comparison against the command validity threshold to determine the validity of host commands.

At block 1120, an operating state may be entered to reject invalid host commands. For example, based on the confidence value from the operating model being below the command validity threshold (thus meeting the command validity threshold for a state change), the operation monitor may trigger a state change to reject host commands as invalid until corrective action is taken and the command validity operating state is returned to a valid state.

Figure 12:
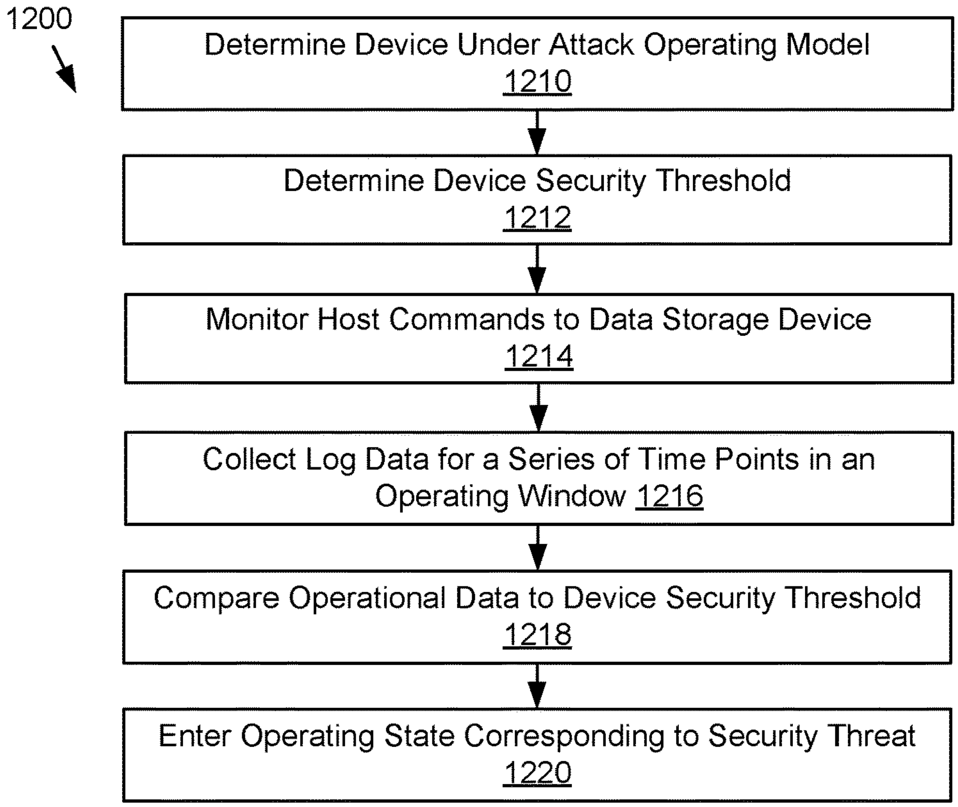
FIG. 12 is a flowchart of an example method of offloading a device under attack model training processing task.

As shown in FIG. 12, storage device 500 may be operated according to an example method for offloading a device under attack model training processing task, i.e., according to method 1200 illustrated by blocks 1210-1220 in FIG. 12.

At block 1210, a device under attack operating model may be determined. For example, the data storage device may include an operation monitor including a device under attack operating model based on a network of node coefficients trained by machine learning.

At block 1212, a device security threshold may be determined. For example, the device under attack operating model may generate a confidence value as an operating model output value and the device security threshold may include a confidence threshold value for triggering a change in a device security state.

At block 1214, operational data related to device security in the data storage device may be monitored. For example, the operation monitor may monitor device security parameters, such as internal firmware versions, interface lock states, internal security checks, firmware authentication traces, pseudo random values histories, cryptographic health tests, and vulnerability detector outputs, as operational data and store it as log data.

At block 1216, log data may be collected for a series of time points in an operating window. For example, a task manager may select log data for the device security parameters from an operating window for training or retraining the device under attack operating model. Training and/or retraining may be executed according to method 900 of FIG. 9.

At block 1118, operational data may be compared to the device security threshold using the operating model. For example, the operational data collected by the operations monitor may be processed using the operating model and the node coefficients determined by the training process of method 900 to generate a run-time confidence value for comparison against the device security threshold to determine the likelihood of a security breach.

At block 1120, an operating state may be entered to correspond to a security threat. For example, based on the confidence value from the operating model being below the device security threshold (thus meeting a device security threshold for a state change), the operation monitor may trigger a state change to enter a device under attack state that enters a read-only mode until corrective action is taken to return the data storage device to a secure state.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:

a data storage device comprising:

a peripheral interface configured to connect to a host system, wherein the host system is configured to send host processing tasks to a processor device;

a storage medium configured to store host data;

a direct memory access service configured to:

store, to a host memory buffer of the host system and through the peripheral interface, a first set of task input data; and access, from the host memory buffer and through the peripheral interface, a first set of task output data; and a processing offload service configured to:

receive, from the host system, notification of a processor availability window; and notify, through the peripheral interface and responsive to the processor availability window, the processor device to initiate a first processing task on the first set of task data, wherein the processor device comprises a graphics processing unit.

2. The system of claim 1, further comprising:

a peripheral bus configured for communication among the data storage device, the host system, and the processor device; and the host system comprising:

a host processor; and a host memory device comprising a set of host memory locations configured to be:

allocated to the host memory buffer;

accessible to the data storage device using direct memory access; and accessible to the processor device using direct memory access.

3. The system of claim 2, wherein the host memory buffer is further configured with:

a first subset of the set of host memory locations allocated to task input data and including the first set of task input data;

a second subset of the set of host memory locations allocated to task output data and including the first set of task output data; and a third subset of the set of host memory locations allocated to a status register configured to include at least one status indicator for the first processing task.

4. The system of claim 2, wherein the host system further comprises a scheduling service configured to:

monitor availability of the graphics processing unit;

determine the processor availability window for the graphical processing unit; and notify the data storage device of the processor availability window.

5. The system of claim 1, further comprising the processor device, the processor device configured to:

receive the notification to initiate the first processing task;

access, using direct memory access to the host memory buffer, the first set of task input data;

process, using a first set of task code for the first processing task, the first set of task input data to determine the first set of task output data;

store, using direct memory access, the first set of task output data to the host memory buffer; and notify, responsive to storing the first set of task output data to the host memory buffer, the data storage device that the first processing task is complete.

6. The system of claim 5, wherein:

the processing offload service is further configured to determine the first set of task code for the first processing task; and the notification to initiate the first processing task includes the first set of task code for the first processing task.

7. The system of claim 5, wherein:

the data storage device further comprises a read channel configured for an error correction capability;

the first set of task input data includes a host data block including:

a number of unrecoverable error correction code errors exceeding the error correction capability of the read channel in the data storage device; and a set of subblocks including at least one parity subblock;

the first set of task code for the first processing task is a data recovery model that includes parallel exclusive-or operations across the set of subblocks; and the first set of task output data is based on the parallel exclusive-or operations.

8. The system of claim 5, wherein:

the data storage device further comprises at least one operation monitor comprising an operating model configured to trigger an operating state change responsive to an operating threshold;

the operating model is based on a network of node coefficients determined by machine learning;

the first set of task input data includes operational data from the data storage device at a first plurality of time points;

the first set of task code for the first processing task is a machine learning model for determining node coefficient values for the network of node coefficients; and the first set of task output data includes the node coefficient values for the network of node coefficients.

9. The system of claim 8, wherein:

the processing offload service is further configured to:

periodically determine, based on the at least one operation monitor, that a retraining condition is met;

periodically determine, responsive to the retraining condition being met, additional sets of task input data from operational data from the data storage device at additional pluralities of time points after the first plurality of time points;

periodically initiate, based on the additional sets of task input data, additional processing tasks based on the machine learning model for determining the node coefficient values for the network of node coefficients;

periodically determine updated node coefficient values based on the node coefficient values determined by the processor device; and periodically update the operating model based on the updated node coefficient values for a most recent retraining condition.

10. The system of claim 8, wherein:

the operating model includes a host operations validator configured to monitor a flow of data between the data storage device and the host memory buffer to enforce valid commands to the data storage device;

the operating threshold includes a command validity threshold by which the operating state rejects invalid commands; and the operational data includes a set of log data, collected for a series of time points in an operating window, for:

host commands received by the data storage device; and direct memory access commands sent to the host system by the data storage device.

11. The system of claim 8, wherein:

the operating model includes a device under attack operating model configured to monitor device security parameters for the data storage device;

the operating threshold includes a device security threshold by which the operating state responds to a security threat; and the operational data includes a set of log data, collected for a series of time points in an operating window, for device security parameters.

12. A computer-implemented method, comprising:

determining, by a data storage device, a number of unrecoverable error correction code errors in a host data block, wherein:

the number of unrecoverable error correction code errors in the host data block exceed an error correction capability of a read channel in the data storage device; and the host data block includes a set of subblocks including at least one parity subblock;

storing, by the data storage device and to a host memory buffer of a host system, a first set of task input data comprising the host data block;

notifying a processor device to initiate a first processing task on the first set of task data in the host memory buffer, wherein:

the processor device comprises a graphics processing unit; and the first processing task comprises execution of a data recovery model; and accessing, by the data storage device and from the host memory buffer, a first set of task output data based on the data recovery model and the host data block.

13. The computer-implemented method of claim 12, further comprising:

sending, by the host system, host processing tasks to the processing device;

monitoring, by the host system, availability of the graphics processing unit;

determining, by the host system, a processor availability window for the graphical processing unit; and notifying the data storage device of the processor availability window, wherein notifying the processor device to initiate the first processing task is responsive to the processor availability window.

14. The computer-implemented method of claim 12, further comprising:

receiving, by the processing device, the notification to initiate the first processing task;

accessing, by the processing device and using direct memory access, the first set of task input data from the host memory buffer;

processing, by the processing device and using a first set of task code for the first processing task, the first set of task input data to determine the first set of task output data;

storing, by the processing device and using direct memory access, the first set of task output data to the host memory buffer; and notifying, responsive to storing the first set of task output data to the host memory buffer, the data storage device that the first processing task is complete.

15. The computer-implemented method of claim 14, further comprising:

executing, by the processing device and based on the first set of task code for the data recovery model, parallel exclusive-or operations across the set of subblocks, wherein the first set of task output data is based on the parallel exclusive-or operations.

16. The computer-implemented method of claim 14, further comprising:

triggering, by an operating model in the data storage device, an operating state change responsive to an operating threshold, wherein the operating model is based on a network of node coefficients determined by machine learning;

collecting, by the data storage device, operational data from the data storage device at a first plurality of time points, wherein a second set of task input data includes the operational data; and executing, by the processing device, a second set of task code for a machine learning model to determine node coefficient values for the network of node coefficients, wherein a second set of task output data includes the node coefficient values for the network of node coefficients.

17. The computer-implemented method of claim 16, further comprising:

periodically determining, based on the operating model, that a retraining condition is met;

periodically determining, responsive to the retraining condition being met, additional sets of task input data from operational data from the data storage device at additional pluralities of time points after the first plurality of time points;

periodically initiating, based on the additional sets of task input data, additional processing tasks based on the machine learning model for determining the node coefficient values for the network of node coefficients;

periodically determining updated node coefficient values based on the node coefficient values determined by the processor device; and periodically updating the operating model based on the updated node coefficient values for a most recent retraining condition.

18. The computer-implemented method of claim 16, further comprising:

monitoring, using a host operations validator operating model in the data storage device, a flow of data between the data storage device and the host memory buffer to enforce valid commands to the data storage device;

collecting, by the data storage device, the operational data that includes a set of log data for a series of time points in an operating window for:

host commands received by the data storage device; and direct memory access commands sent to the host system by the data storage device;

comparing, using the network of node coefficients for the host operations validator operating model, the operational data to a command validity threshold as the operating threshold; and entering, based on the operational data meeting the command validity threshold, an operating state configured to reject invalid commands.

19. The computer-implemented method of claim 16, further comprising:

monitoring, using a device under attack operating model, device security parameters for the data storage device;

collecting, by the data storage device, the operational data that includes a set of log data for a series of time points in an operating window for the device security parameters;

comparing, using the network of node coefficients for the device under attack operating model, the operational data to a device security threshold as the operating threshold; and entering, based on the operational data meeting the device security threshold, an operating state corresponding to a security threat.

20. A data storage device comprising:

a peripheral interface configured to connect to a host system;

a storage medium configured to store host data;

means for triggering, by an operating model in the data storage device, an operating state change responsive to an operating threshold, wherein the operating model is based on a network of node coefficients determined by machine learning;

means for collecting, by the data storage device, operational data from the data storage device at a first plurality of time points;

means for storing, to a memory buffer accessible to a processor device, a first set of task input data comprising the operational data;

means for initiating a first processing task on the first set of task data in the memory buffer by the processor device, wherein:

the processor device comprises a graphics processing unit; and the first processing task comprises executing a machine learning model to determine node coefficient values for the network of node coefficients; and means for accessing, from the memory buffer, a first set of task output data comprising the determined node coefficient values for the network of node coefficients.

* * * * *